(12) United States Patent
Yamazaki et al.

(10) Patent No.: US 10,699,628 B2
(45) Date of Patent: *Jun. 30, 2020

(54) DISPLAY SYSTEM AND VEHICLE

(71) Applicant: SEMICONDUCTOR ENERGY LABORATORY CO., LTD., Atsugi-shi, Kanagawa-ken (JP)

(72) Inventors: Shunpei Yamazaki, Tokyo (JP); Takayuki Ikeda, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 154 days.

This patent is subject to a terminal disclaimer.

(21) Appl. No.: 15/596,138

(22) Filed: May 16, 2017

(65) Prior Publication Data

US 2017/0337867 A1 Nov. 23, 2017

(30) Foreign Application Priority Data

May 17, 2016 (JP) .................................. 2016-098706

(51) Int. Cl.
*G09G 3/20* (2006.01)
*G09G 3/3225* (2016.01)
(Continued)

(52) U.S. Cl.
CPC ........... *G09G 3/2092* (2013.01); *B60K 35/00* (2013.01); *B60K 37/02* (2013.01); *G09G 3/3225* (2013.01);
(Continued)

(58) Field of Classification Search
None
See application file for complete search history.

(56) References Cited

U.S. PATENT DOCUMENTS 6,147,630 A * 11/2000 Sasai .................... G06G 7/12
341/110
9,614,022 B2 4/2017 Miyake et al.
(Continued)

FOREIGN PATENT DOCUMENTS

JP 2004-110421 A 4/2004
JP 2005-112251 A 4/2005
JP 2013-134295 A 7/2013

OTHER PUBLICATIONS

Aslam-Siddiqi.A et al., "A 16 ×16 Nonvolatile Programmable Analog Vector-Matrix Multiplier", IEEE Journal of Solid-State Circuits, Oct. 1, 1998, vol. 33, No. 10, pp. 1502-1509.

*Primary Examiner* — Andre L Matthews
(74) *Attorney, Agent, or Firm* — Nixon Peabody LLP; Jeffrey L. Costellia

(57) ABSTRACT

An object is to provide a display system with a novel structure and a vehicle. The display system includes a display and a control IC. The control IC includes a frame memory, an arithmetic circuit, and a memory circuit. The display has a curved display surface. The frame memory has a function of holding first image data dedicated to displaying an image on a flat surface. The memory circuit has a function of storing shape data on the display. The arithmetic circuit has a function of converting first coordinates of the curved display surface into second coordinates of the flat surface included in the first image data, by performing arithmetic operation in accordance with the shape data. The arithmetic circuit has a function of outputting the first image data stored in the frame memory to the display as second image data on the basis of the second coordinates.

7 Claims, 14 Drawing Sheets

(51) Int. Cl.
  *G09G 3/3275* (2016.01)
  *B60K 35/00* (2006.01)
  *B60K 37/02* (2006.01)
  *G09G 5/14* (2006.01)

(52) U.S. Cl.
  CPC .............. *G09G 3/3275* (2013.01); *G09G 5/14* (2013.01); *B60K 2370/15* (2019.05); *B60K 2370/52* (2019.05); *G09G 2300/0426* (2013.01); *G09G 2300/0814* (2013.01); *G09G 2300/0842* (2013.01); *G09G 2320/068* (2013.01); *G09G 2320/08* (2013.01); *G09G 2330/021* (2013.01); *G09G 2354/00* (2013.01); *G09G 2380/02* (2013.01); *G09G 2380/10* (2013.01)

(56) References Cited

U.S. PATENT DOCUMENTS

| | | | |
|---|---|---|---|
| 9,851,942 B2 * | 12/2017 | Kurokawa | ................. G06F 7/00 |
| 2005/0122238 A1 * | 6/2005 | Nomura | ................. G06N 3/049 341/53 |
| 2016/0044751 A1 | 2/2016 | Ikeda et al. | |
| 2016/0103649 A1 | 4/2016 | Yoshitani et al. | |
| 2016/0295152 A1 | 10/2016 | Kurokawa | |
| 2016/0343452 A1 | 11/2016 | Ikeda et al. | |
| 2017/0053603 A1 | 2/2017 | Hirakata | |
| 2017/0061863 A1 | 3/2017 | Eguchi | |
| 2017/0063351 A1 | 3/2017 | Kurokawa | |
| 2017/0116512 A1 | 4/2017 | Kurokawa | |
| 2017/0118479 A1 | 4/2017 | Kurokawa | |
| 2017/0221410 A1 | 8/2017 | Akimoto et al. | |
| 2017/0263291 A1 | 9/2017 | Kurokawa | |
| 2017/0270405 A1 | 9/2017 | Kurokawa | |
| 2017/0317085 A1 | 11/2017 | Kurokawa | |

* cited by examiner

301

311

302

311

303

311

304

311

DISPLAY SYSTEM AND VEHICLE

BACKGROUND OF THE INVENTION

1. Field of the Invention

One embodiment of the present invention relates to a display system and a vehicle.

2. Description of the Related Art

A curved display including an organic electroluminescent (EL) element has been suggested (e.g., Patent Document 1). Note that a curved display refers to a display having a curved display surface.

Application of a curved display to an instrument panel of a vehicle such as a car is expected to improve the design (e.g., Patent Document 2).

PATENT DOCUMENT

Patent Document 1: Japanese Published Patent Application No. 2013-134295
Patent Document 2: Japanese Published Patent Application No. 2005-112251

SUMMARY OF THE INVENTION

When image data supplied to a curved display is originally image data dedicated to displaying an image on a flat display, a user might perceive distortion of an image displayed on the curved display. Note that a flat display refers to a display having a flat display surface.

When image data dedicated to displaying an image on a flat display is corrected to perform display on a plurality of curved displays, an enormous amount of arithmetic processing in a host controller for supplying image signals is required, which makes it difficult to complete arithmetic processing within a fixed period. When an arithmetic circuit for performing digital processing, such as a graphic processing unit (GPU) or a central processing unit (CPU), is provided for each display to convert image data dedicated to displaying an image on a flat display into image data dedicated to displaying an image on a curved display, power consumption and manufacturing cost increase as the amount of arithmetic operation increases.

An object of one embodiment of the present invention is to provide a novel display system, a vehicle including the display system, or the like.

Another object of one embodiment of the present invention is to provide a novel display system in which distortion of an image displayed on a curved display is reduced even if original image data is data dedicated to displaying an image on a flat display, a vehicle including the display system, or the like. Another object of one embodiment of the present invention is to provide a novel display system in which an increase in power consumption or manufacturing cost is suppressed even when a correction circuit is provided to display an image on a curved display based on image data dedicated to displaying an image on a flat display, a vehicle including the display system, or the like.

One embodiment of the present invention is a display system including includes a display and a control IC. The control IC includes a frame memory, an arithmetic circuit, and a memory circuit. The display has a curved display surface. The frame memory has a function of holding first image data for displaying an image on a flat surface. The memory circuit has a function of storing shape data on the display. The arithmetic circuit has a function of converting first coordinates of the curved display surface into second coordinates of the flat surface included in the first image data, by performing arithmetic operation in accordance with the shape data. The arithmetic circuit has a function of outputting the first image data stored in the frame memory to the display as second image data on the basis of the second coordinates.

In the display system of one embodiment of the present invention, it is preferred that the memory circuit include a transistor and a capacitor, and that the transistor contain an oxide semiconductor in a semiconductor layer including a channel formation region.

In the display system of one embodiment of the present invention, it is preferred that the arithmetic circuit include a product-sum operation circuit, and that the product-sum operation circuit include an analog circuit for performing product-sum operation.

One embodiment of the present invention is a vehicle that includes a dashboard including any of the above display systems of one embodiment of the present invention, and a window.

Note that other embodiments of the present invention will be shown in DETAILED DESCRIPTION OF THE INVENTION below and the drawings.

One embodiment of the present invention can provide a novel display system, a vehicle including the display system, or the like.

Another embodiment of the present invention can provide a novel display system in which distortion of an image displayed on a curved display is reduced even if original image data is data dedicated to displaying an image on a flat display, a vehicle including the display system, or the like. Another embodiment of the present invention can provide a novel display system in which an increase in power consumption or manufacturing cost is suppressed even when a correction circuit is provided to display an image on a curved display based on image data dedicated to displaying an image on a flat display, a vehicle including the display system, or the like.

BRIEF DESCRIPTION OF THE DRAWINGS

In the accompanying drawings.

DETAILED DESCRIPTION OF THE INVENTION

Embodiments of the present invention will be hereinafter described with reference to the accompanying drawings. Note that embodiments of the present invention can be implemented with various modes, and it is readily appreciated by those skilled in the art that modes and details can be changed in various ways without departing from the spirit and scope of the present invention. Thus, the present invention should not be interpreted as being limited to the following description.

Structure of Display System

A structure example of a display system of one embodiment of the present invention will be described. The display system can be applied to a display provided on a curved surface.

Figure 1:
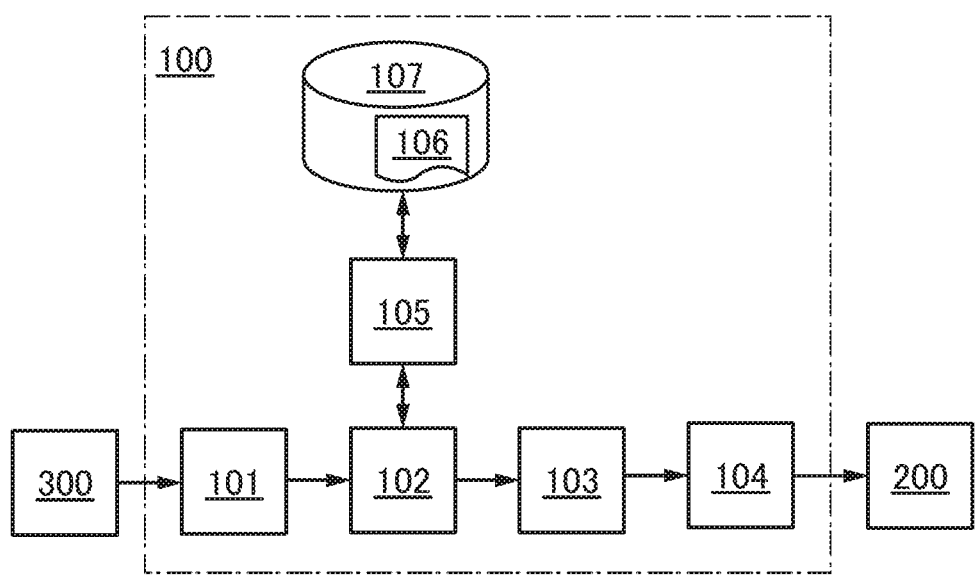
FIG. 1 illustrates a structure of a display system.

FIG. 1 is a block diagram for explaining the structure of a display system. FIG. 1 illustrates a control IC 100, a display 200, and a host controller 300. The control IC 100 includes an interface 101, a frame memory 102, a timing controller 103, a display driver IC 104, an arithmetic circuit 105, and a memory circuit 107. The memory circuit 107 contains shape data 106.

The display 200 has a curved display surface. A display having a curved display surface is also referred to as a curved display. When image data supplied to a curved display is image data dedicated to displaying an image on a flat display (a display having a flat display surface), a user might perceive distortion of an image displayed on the curved display.

In view of the above, the control IC 100 is configured to correct image data dedicated to displaying an image on a flat display in accordance with the shape of the display 200 and output the corrected data. This configuration can reduce distortion that is perceived by a user when the user sees an image displayed on the curved display.

Image data dedicated to displaying an image on a flat display is transferred from the host controller 300 through the interface 101 and stored in the frame memory 102. The image data stored in the frame memory 102 corresponds to gray level data supplied to coordinates (pixels) of the flat display. The gray level data supplied to the coordinates (pixels) are sequentially written in predetermined addresses in the frame memory 102 and stored. As the frame memory 102, dual-port SRAM capable of performing data writing and data reading concurrently is preferably used. This structure enables correction of image data without delay.

The shape data 106 stored in the memory circuit 107 is data corresponding to the shape of the display 200. The arithmetic circuit 105 corrects an address of image data to be read from the frame memory 102, by arithmetic operation, in accordance with the shape data 106. The arithmetic circuit 105 reads image data from a specified address in the frame memory 102 on the basis of the corrected address, and outputs the image data as image data supplied to the curved display.

In other words, the arithmetic circuit 105 performs arithmetic operation on coordinates of a flat surface on which an image based on image data dedicated to displaying an image on a flat display is displayed, in accordance with the shape data 106, and converts the coordinates into coordinates of the curved surface on which the image is displayed. Then, the arithmetic circuit 105 reads image data from an address in the frame memory 102 that corresponds to the coordinates of the curved surface, and outputs the image data as image data supplied to the curved display.

Alternatively, the arithmetic circuit 105 performs arithmetic operation on coordinates of a curved surface when an image based on image data supplied to the curved display is displayed on a flat surface, in accordance with the shape data 106, and converts the coordinates into coordinates of the flat surface on which the image is displayed. Then, the arithmetic circuit 105 reads image data from an address in the frame memory 102 that corresponds to the coordinates of the flat surface, and outputs the image data as image data supplied to the curved display.

An example of the interface 101 is a circuit that converts one signal into another signal compatible with interface technology such as DVI, HDMI (registered trademark), eDP, iDP, V-by-One HS, FPD-Link II, or Advanced PPmL.

Each of the timing controller 103 and the display driver IC 104 is a circuit for outputting various kinds of control signals for displaying images on the display 200 on the basis of corrected image data read from the frame memory 102.

The description is made on a specific example of a structure for correcting image data dedicated to displaying an image on a flat display to image data supplied to a curved display and outputting the corrected image data.

Figure 2A:
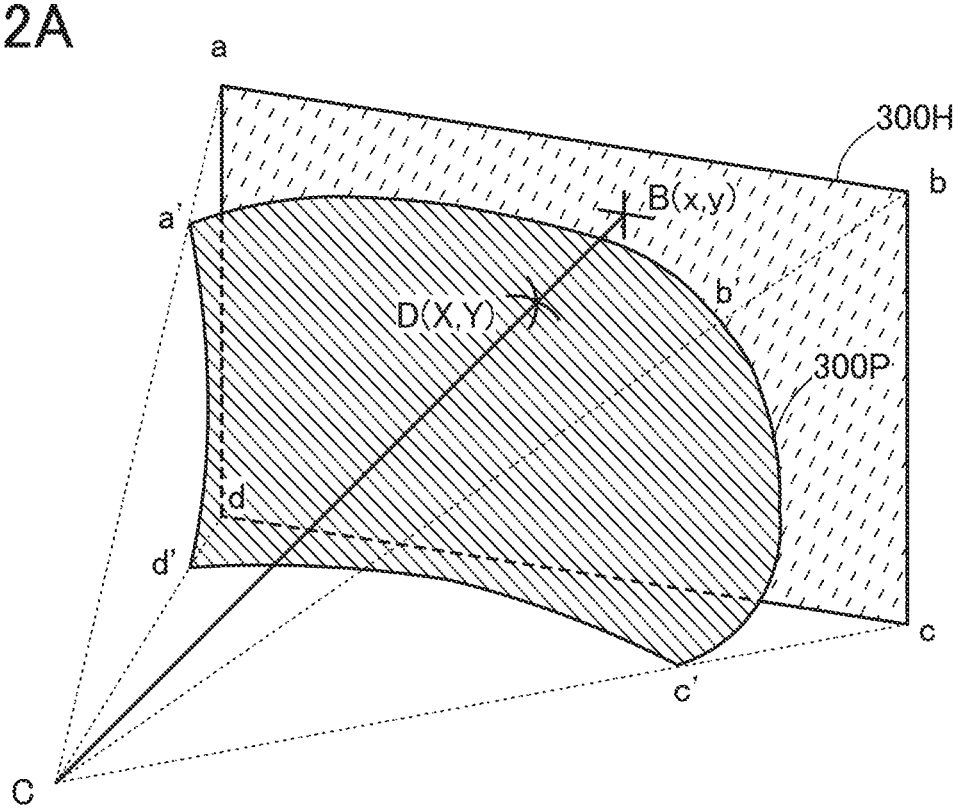
FIGS. 2A and 2B are diagrams each explaining a structure of a display system.

FIG. 2A illustrates a flat display 300H (a region indicated by points a, b, c, and d) and a curved display 300P (a region indicated by points a', b', c', and d'). When a user looks at the curved display 300P from a point C shown in FIG. 2A, coordinates are corrected such that coordinates B(x, y) of the flat display 300H are projected onto a corresponding position in the curved display 300P. That is, when the curved display 300P is placed between the point C and the coordinates B, the coordinates B(x, y) are corrected to coordinates D(X, Y); thus, the distortion perceived by the user who looks at the curved display 300P is reduced.

Figure 2B:
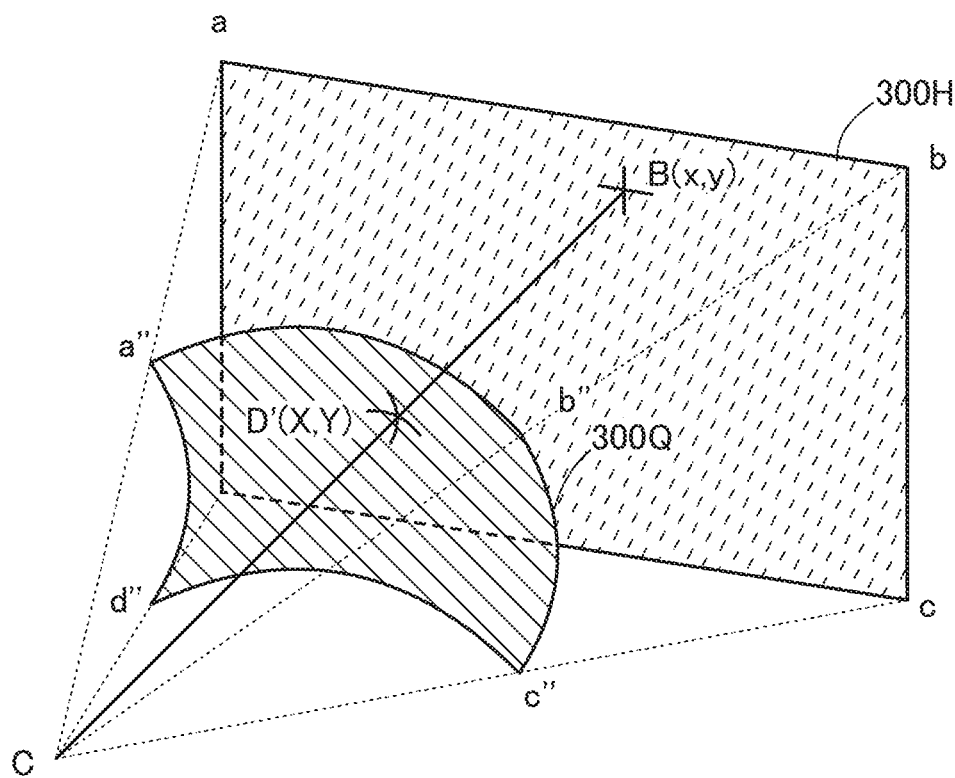

FIG. 2B illustrates the flat display 300H and a curved display 300Q (a region indicated by points a", b", c", and d") having a shape different from that in FIG. 2A. When a user looks at the curved display 300Q from the point C shown in FIG. 2B, coordinates are corrected such that the coordinates B(x, y) of the flat display 300H are projected onto a corresponding position in the curved display 300Q. That is, when the curved display 300Q is placed between the point C and the coordinates B, the coordinates B(x, y) are corrected to coordinates D'(X, Y) that are different from the coordinates D(X, Y) in FIG. 2A; thus, the distortion perceived by the user who looks at the curved display 300Q is reduced.

In the case of using displays with different shapes like the curved displays 300P and 300Q in FIGS. 2A and 2B, it is necessary to correct coordinates corresponding to the coordinates B(x, y) of the flat display 300H. For that reason, the control IC 100 illustrated in FIG. 1 is provided for each display.

Figure 3:
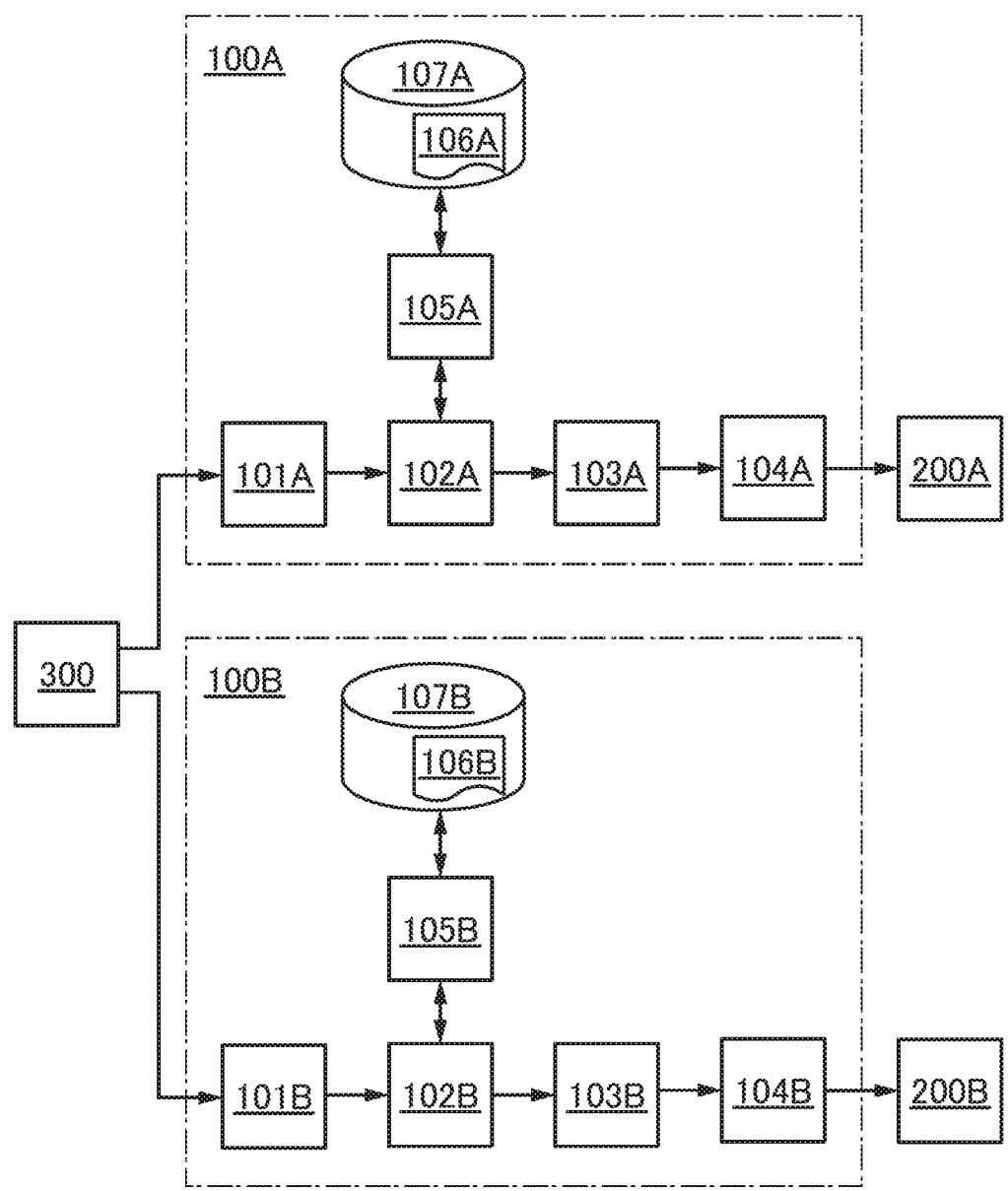
FIG. 3 illustrates a structure of a display system.

FIG. 3 is a block diagram for explaining the structure of a display system in which control ICs are provided for the respective displays. FIG. 3 illustrates a control IC 100A, a display 200A, a control IC 100B, a display 200B, and the host controller 300. The control IC 100A includes an interface 101A, a frame memory 102A, a timing controller 103A, a display driver IC 104A, an arithmetic circuit 105A, and a memory circuit 107A. The memory circuit 107A contains shape data 106A. The control IC 100B includes an interface 101B, a frame memory 102B, a timing controller 103B, a display driver IC 104B, an arithmetic circuit 105B, and a memory circuit 107B. The memory circuit 107B contains shape data 106B. The components in FIG. 3 correspond to the components in FIG. 1.

When the display 200A and the display 200B in FIG. 3 are curved displays with different shapes, the shape data 106A in the memory circuit 107A included in the control IC 100A is different from the shape data 106B in the memory circuit 107B included in the control IC 100B. Accordingly, even when the same image data is supplied from the host controller 300 to the display 200A and the display 200B, the image data can be corrected to image data corresponding to the shape of each display. This eliminates an enormous amount of arithmetic processing in the host controller 300 when image data is supplied to the display 200A and the display 200B with different shapes.

FIGS. 4A to 4E illustrate structure examples in which a plurality of displays are combined to function as one display.

Figure 4A:
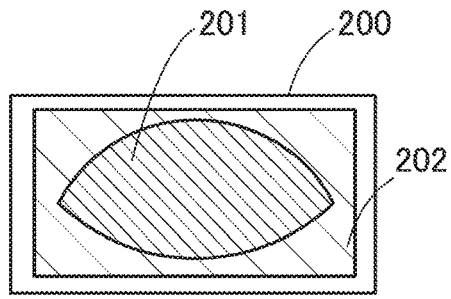
FIGS. 4A to 4E each illustrate a structure of a display system.

The display 200 illustrated in FIG. 4A includes a display region 201 and a non-display region 202. The non-display region 202 is a region that does not perform grayscale display based on image data or performs black display. The display region 201 is a region that performs grayscale display based on image data.

Figure 4B:
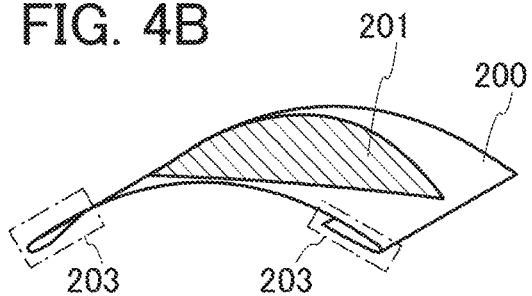

When the non-display region 202 is large in the display 200 in FIG. 4A, an end portion of the display 200 is preferably folded. An example of this case is shown in FIG. 4B. In FIG. 4B, a folded portion 203 of the display 200 can save the space occupied by the display 200.

Figure 4C:
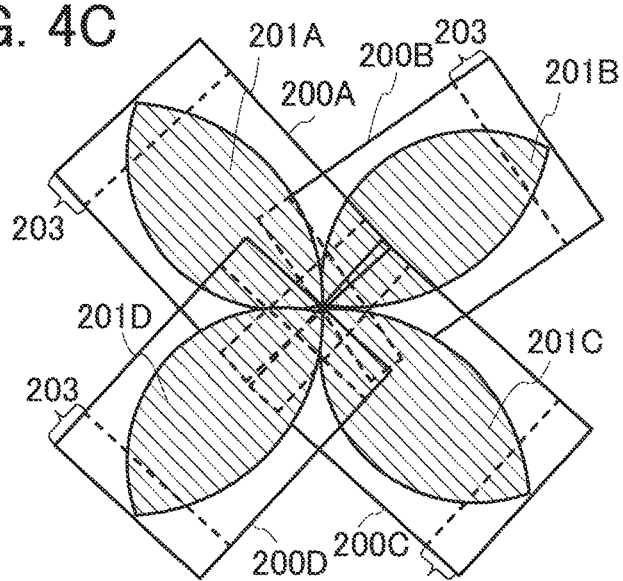
Figure 4D:
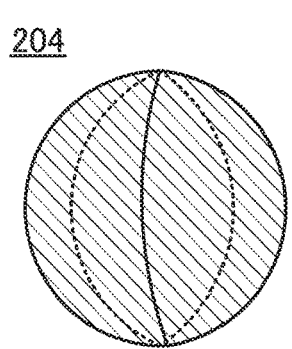

FIG. 4C is a development diagram in which displays 200A to 200D each of which is the display 200 in FIG. 4B are combined to function as one display. A spherical display 204 illustrated in FIG. 4D is made by a combination of the displays 200A to 200D. Display regions 201A to 201D included in the displays 200A to 200D are shown to have the same shape; however, they may be different in shape, in which case a display with a more complicated shape can be provided.

Figure 4E:
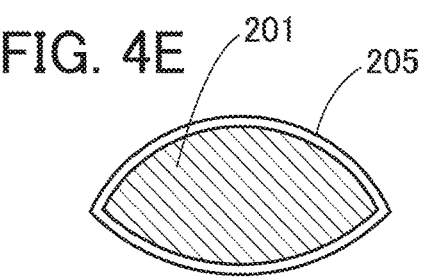

Note that FIG. 4B illustrates the structure in which a rectangular display is folded so that a display region has an intended shape; alternatively, as illustrated in FIG. 4E, a display 205 with a desired shape may be manufactured and provided with a display region with a shape that matches the display 205.

Example of Arithmetic Processing in Arithmetic Circuit

Figure 5A:
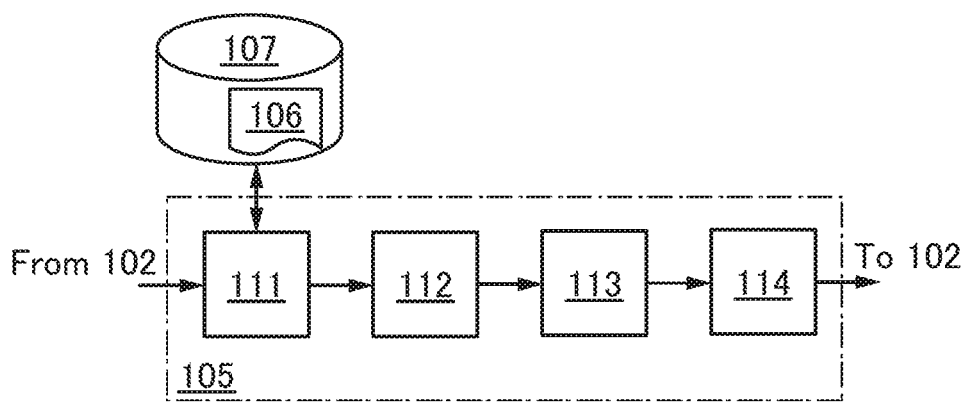
FIGS. 5A and 5B are diagrams for explaining a structure of a display system.

FIG. 5A is a block diagram for explaining an example of arithmetic processing performed in the arithmetic circuit 105 illustrated in FIG. 1. The arithmetic circuit 105 illustrated in FIG. 5A includes a lookup table 111, an exponentiation circuit 112, a product-sum operation circuit 113, and a square-root operation circuit 114. FIG. 5A also illustrates the memory circuit 107 that stores the shape data 106.

Figure 6A:
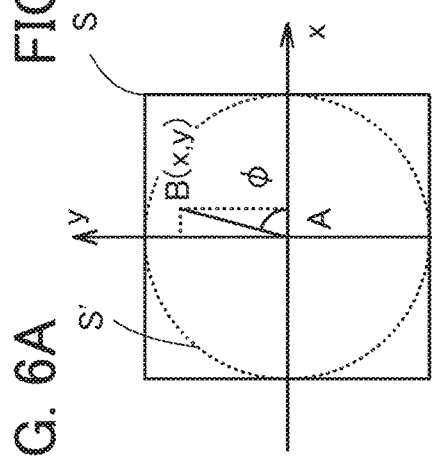
FIGS. 6A to 6H are diagrams for explaining a structure of a display system.

FIGS. 6A to 6H are diagrams for explaining an example in which an image for a flat display is displayed on a curved display. In FIGS. 6A to 6H, display is corrected so that an image for a flat display is projected onto a curved display. Display is performed so that an image on a square flat plane S shown in FIG. 6A is projected onto a curved plane S'. Assuming that given coordinates on the flat plane S are B(x, y), display is performed so that the image is projected onto coordinates D(X, Y) on the curved plane S'.

Figure 6B:
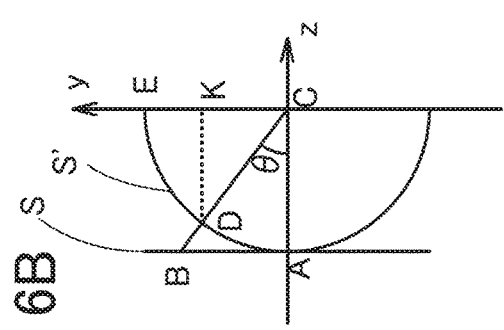
Figure 6C:
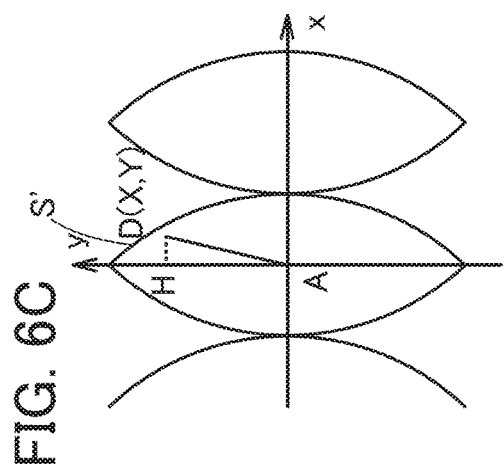
Figure 6D:
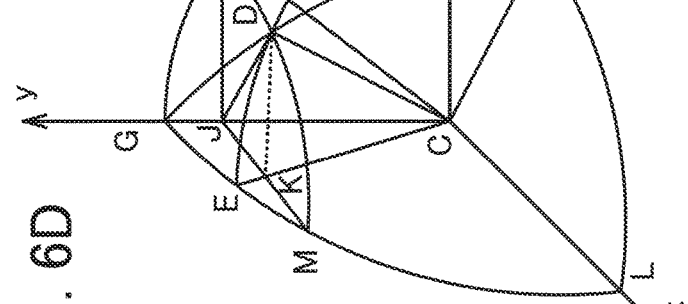
Figure 6E:
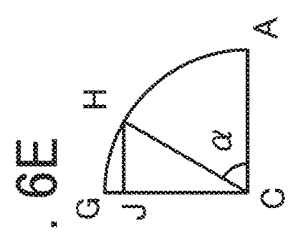
Figure 6F:
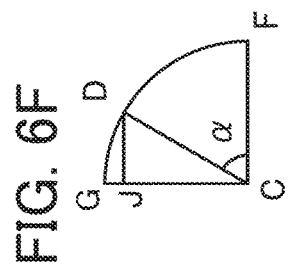
Figure 6G:
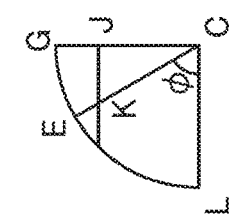
Figure 6H:
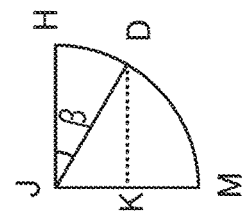

As illustrated in FIGS. 6A to 6H, two axes on the flat plane S are the x-axis and the y-axis, and an axis toward the point C that is in the direction perpendicular to the flat plane S and serves as the viewpoint of the user is the z-axis. FIG. 6A shows overlap of the flat plane S and the curved plane S' from the point C serving as the user's viewpoint, which can be represented by the xy coordinates. FIG. 6B shows the point C, the flat plane S, and the curved plane S', which can be represented by the yz coordinates. FIG. 6C is a development diagram of the curved plane S' to be represented by the xy coordinates. FIG. 6D shows the point C and a curved plane including an arc AG, an arc AL, an arc GL, an arc GF, and the like as part of the curved plane S', which can be represented by the xyz coordinates. FIG. 6E shows a plane ACG excerpted from FIG. 6D. FIG. 6F shows a plane FCG excerpted from FIG. 6D. FIG. 6G shows a plane CLG excerpted from FIG. 6D. FIG. 6H shows a plane JMH excerpted from FIG. 6D. FIGS. 6A to 6H also show an angle $\varphi$, an angle $\theta$, an angle $\alpha$, and an angle $\beta$.

Note that X in the coordinates D(X, Y) is an arc DH and can be represented by Formula 1. In formulae and the like described using FIGS. 6A to 6H, r is a radius of curvature of the curved plane S'. The distance from the point C serving as the user's viewpoint to the flat plane S is also denoted by r.

[Formula 1]

$$X = \overline{JH}\beta = r\beta \cos \alpha \qquad (1)$$

Furthermore, Y in the coordinates D(X, Y) is an arc AH and can be represented by Formula 2.

[Formula 2]

$$Y = r\alpha \qquad (2)$$

With the use of the angle $\varphi$, x and y in the coordinates B(x, y) can be represented by Formula 3.

[Formula 3]

$$\tan\varphi = \frac{y}{x} \qquad (3)$$

With the use of the angle $\theta$, x and y in the coordinates B(x, y) can be represented by Formula 4.

[Formula 4]

$$\tan\theta = \frac{\sqrt{x^2 + y^2}}{r} \qquad (4)$$

The length of a line segment DK can be represented by Formula 5.

[Formula 5]

$$\overline{DK} = r \cos \theta = \overline{JH} \cos \beta = r \cos \alpha \cos \beta \qquad (5)$$

The length of a line segment JK can be represented by Formula 6.

[Formula 6]

$$\overline{JK} = \overline{CK} \cos \varphi = r \sin \theta \cos \varphi = \overline{JH} \sin \beta = r \cos \alpha \sin \beta \qquad (6)$$

When Formulae 1 to 6 described above are represented using parameters s and t, $(x^2, y^2)$ can be represented by a determinant in Formula 7. Moreover, s and t can be represented by Formulae 8 and 9.

[Formula 7]

$$\begin{pmatrix} x^2 \\ y^2 \end{pmatrix} = \begin{pmatrix} 0 & r^2 & -r^2 \\ r^2 & -r^2 & 0 \end{pmatrix} \begin{pmatrix} s^2 t^2 \\ s^2 \\ 1 \end{pmatrix} \quad (7)$$

[Formula 8]

$$s = \frac{1}{\cos\frac{Xt}{r}} \quad (8)$$

[Formula 9]

$$t = \frac{1}{\cos\frac{Y}{r}} \quad (9)$$

Figure 5B:
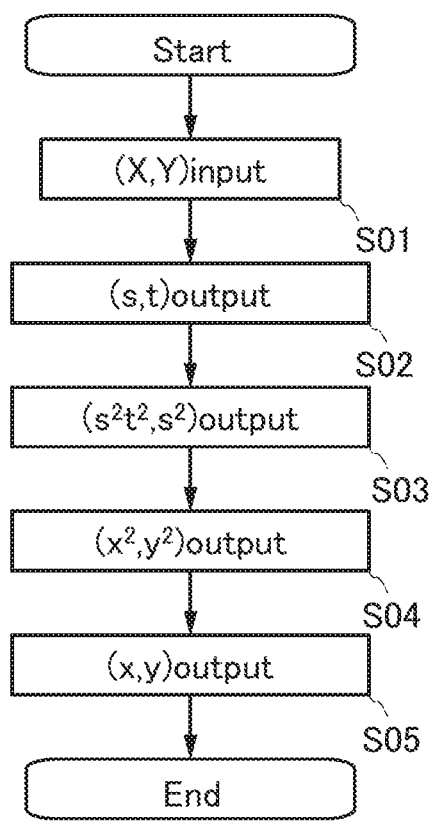

In the block diagram of FIG. 5A, to perform the arithmetic operation explained using Formulae 1 to 9, values of required parameters are calculated according to a flow chart shown in FIG. 5B.

First, X and Y in D(X, Y) are given (Step S01). Then, values of s and t are output using the lookup table 111 (Step S02). In the example of the curved plane illustrated in FIGS. 6A to 6H, data on the curvature radius r is contained as the shape data 106 stored in the memory circuit 107. The lookup table 111 outputs the values of s and t by referring to the shape data 106. The values of s and t are output as analog signals.

Note that the shape data 106 stored in the memory circuit 107 remains unchanged unless the shape of the curve surface included in the display is changed. For this reason, the values of s and t output from the lookup table 111 may be stored in a nonvolatile memory circuit. In this case, it is also possible to omit the memory circuit 107 while values including the shape data 106 to be stored in the memory circuit 107 are stored in the lookup table 111 instead.

Next, based on s and t, which are analog signals output from the lookup table 111, the exponentiation circuit 112 outputs $s^2t^2$ and $s^2$ (Step S03). Values of $s^2t^2$ and $s^2$ are output as analog signals. An example of a circuit configuration of the exponentiation circuit 112 will be described later.

Subsequently, based on $s^2t^2$ and $s^2$, which are the analog signals output from the exponentiation circuit 112, the product-sum operation circuit 113 outputs $(x^2, y^2)$ (Step S04). Values of $(x^2, y^2)$ are output as analog signals. An example of a circuit configuration of the product-sum operation circuit 113 will be described later.

Then, based on $(x^2, y^2)$, which is the analog signal output from the product-sum operation circuit 113, the square-root operation circuit 114 outputs (x, y) (Step S05). Values of (x, y) are output as analog signals. An example of a circuit configuration of the square-root operation circuit 114 will be described later.

Image data for the coordinates B(x, y) obtained from the above arithmetic operation is displayed at the coordinates D(X, Y), whereby an image for a flat surface can be projected onto a curved surface. The above configuration can also be applied to a display with a complicated shape.

Note that the exponentiation circuit 112, the product-sum operation circuit 113, and the square-root operation circuit 114 can obtain an intended arithmetic result by arithmetic processing of analog signals. This can make the power consumption and manufacturing cost unlikely to increase with an increasing amount of arithmetic operation when an arithmetic circuit for performing digital processing, such as a GPU or a CPU, is provided for each display to convert image data dedicated to displaying an image on a flat display into image data dedicated to displaying an image on a curved display.

Figure 7A:
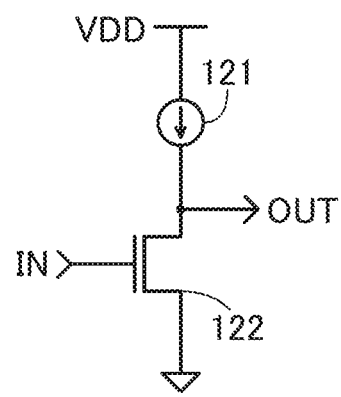
FIGS. 7A and 7B illustrate configurations of an exponentiation circuit and a square-root operation circuit included in a display system.

Configuration Examples of Exponentiation Circuit and Square-Root Operation Circuit FIG. 7A illustrates an example of a circuit capable of performing exponentiation operation in FIG. 5A. An exponentiation circuit illustrated in FIG. 7A includes a current supply circuit 121 and a transistor 122. The exponentiation circuit in FIG. 7A is supplied with a power supply voltage VDD-GND.

An analog voltage is applied to an input terminal IN, and the analog voltage obtained as a result of exponentiation operation is output from an output terminal OUT. The voltage of the output terminal OUT is determined by electrical characteristics of the transistor 122. As the voltage of the output terminal OUT, an output in proportion to the square of the voltage of the input terminal IN is obtained using transistor characteristics in a saturation region.

Figure 7B:
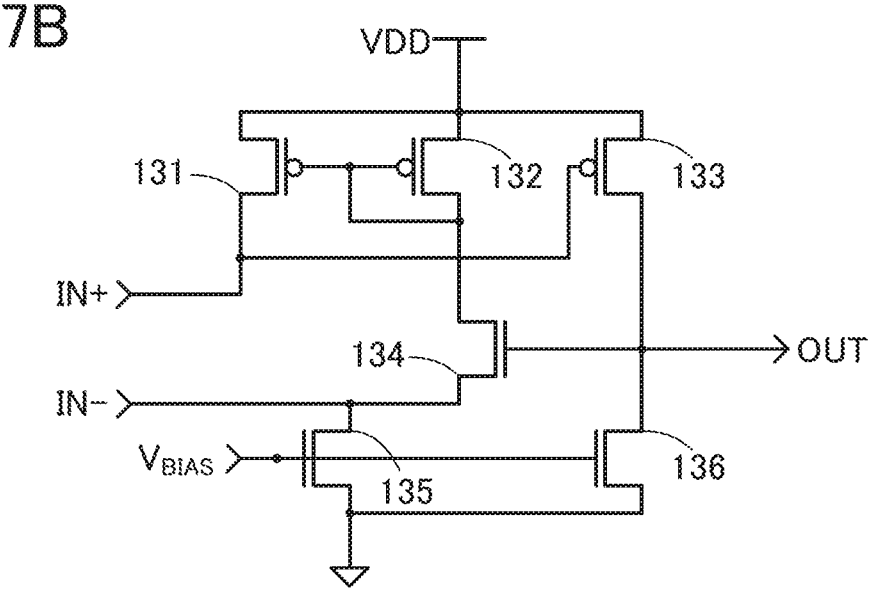

FIG. 7B illustrates an example of a circuit capable of performing square-root operation in FIG. 5A. The square-root operation circuit illustrated in FIG. 7B includes a transistor 131, a transistor 132, a transistor 133, a transistor 134, a transistor 135, and a transistor 136. The square-root operation circuit in FIG. 7B is supplied with the power supply voltage VDD-GND. In FIG. 7B, the transistors 131, 132, and 133 are p-channel transistors, and the transistors 134, 135, and 136 are n-channel transistors. A voltage $V_{BIAS}$ is a voltage for supplying a constant current to the transistors 135 and 136.

An output current of a product-sum operation circuit is input to input terminals IN+ and IN−. As a voltage of an output terminal OUT, an output value in proportion to the half-power of the output current input to the input terminals IN+ and IN− is obtained.

Configuration Example of Product-Sum Operation Circuit

Figure 8:
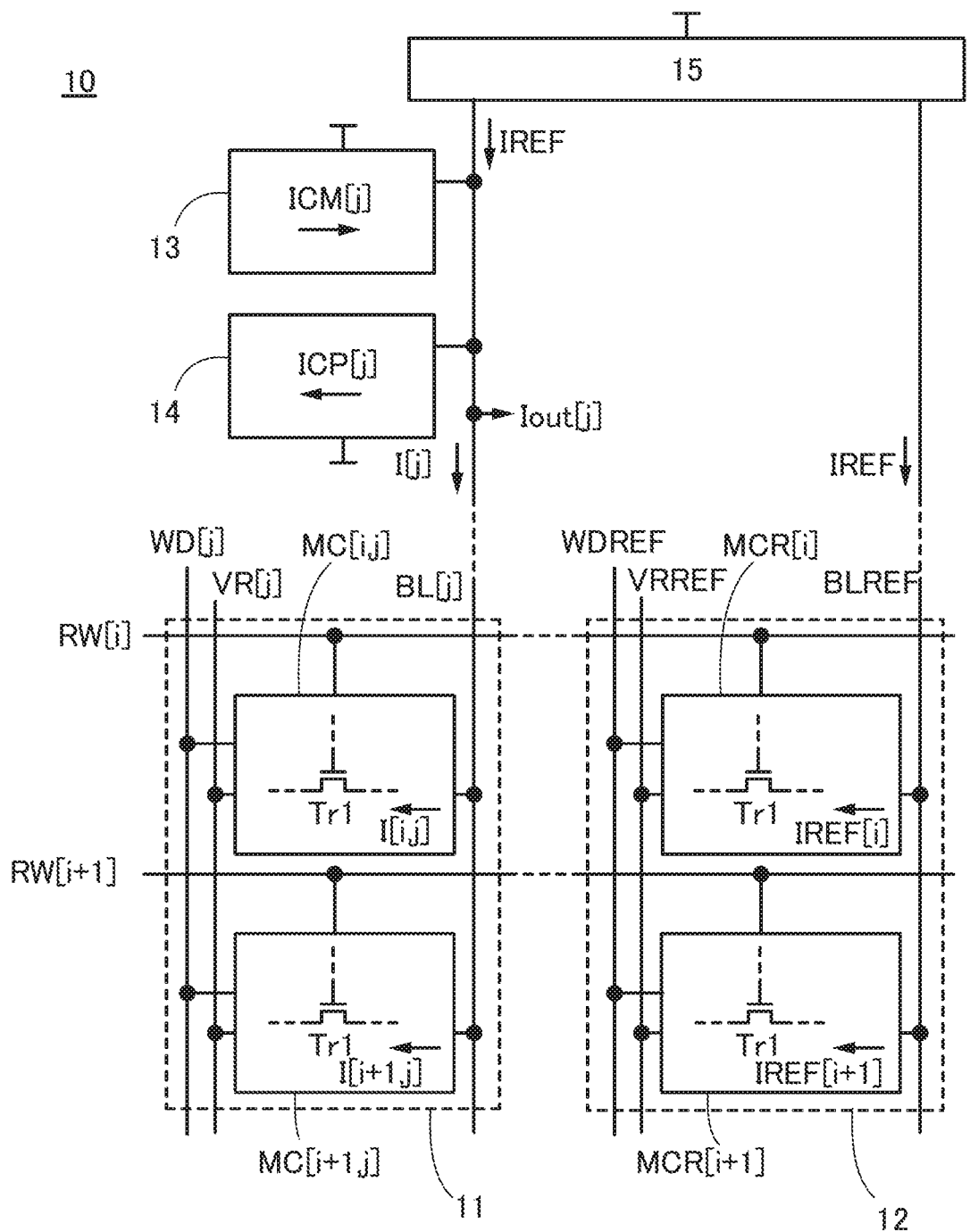
FIG. 8 illustrates a configuration of a product-sum operation circuit included in a display system.

FIG. 8 illustrates a configuration example of a product-sum operation circuit. A product-sum operation circuit 10 illustrated in FIG. 8 includes a memory circuit 11, a reference memory circuit 12, a current source circuit 13, a current sink circuit 14, and a current supply circuit 15.

The memory circuit 11 includes memory cells MC such as a memory cell MC[i, j] and a memory cell MC[i+1, j]. Each memory cell MC includes an element that has a function of converting an input potential into a current. As the element having such a function, an active element such as a transistor can be used, for example. FIG. 8 illustrates an example where each memory cell MC includes a transistor Tr1.

A first analog potential is input to the memory cell MC through a wiring WD such as a wiring WD[j]. The memory cell MC has a function of generating a first analog current corresponding to the first analog potential. Specifically, the drain current of the transistor Tr1 that is obtained when the first analog potential is supplied to a gate of the transistor Tr1 can be used as the first analog current. Hereinafter, a current flowing into the memory cell MC[i, j] is denoted by I[i, j], and a current flowing into the memory cell MC[i+1, j] is denoted by I[i+1, j].

The drain current of the transistor Tr1 operating in a saturation region is not dependent on a voltage between its source and drain and is controlled by the difference between its gate voltage and threshold voltage. Thus, the transistor Tr1 preferably operates in a saturation region. To operate the transistor Tr1 in a saturation region, the gate voltage and the voltage between the source and drain of the transistor Tr1 are assumed to be set within an appropriate range.

Specifically, in the product-sum operation circuit 10 illustrated in FIG. 8, a first analog potential Vx[i, j] or a potential corresponding to the first analog potential Vx[i, j] is input to the memory cell MC[i, j] through the wiring WD[j]. The memory cell MC[i, j] has a function of generating a first analog current corresponding to the first analog potential Vx[i, j]. This means that here, the current I[i, j] in the memory cell MC[i, j] corresponds to the first analog current.

Furthermore, in the product-sum operation circuit 10 in FIG. 8, a first analog potential Vx[i+1, j] or a potential corresponding to the first analog potential Vx[i+1, j] is input to the memory cell MC[i+1, j] through the wiring WD[j]. The memory cell MC[i+1, j] has a function of generating a first analog current corresponding to the first analog potential Vx[i+1, j]. This means that here, the current I[i+1, j] in the memory cell MC[i+1, j] corresponds to the first analog current.

The memory cell MC has a function of holding the first analog potential. In other words, the memory cell MC has a function of holding the first analog current corresponding to the first analog potential by holding the first analog potential.

A second analog potential is input to the memory cell MC through a wiring RW such as a wiring RW[i] or a wiring RW[i+1]. The memory cell MC has a function of adding the second analog potential or a potential corresponding to the second analog potential to the first analog potential that has been held, and a function of holding a third analog potential obtained by the addition. The memory cell MC also has a function of generating a second analog current corresponding to the third analog potential. In other words, the memory cell MC has a function of holding the second analog current corresponding to the third analog potential by holding the third analog potential.

Specifically, in the product-sum operation circuit 10 in FIG. 8, a second analog potential Vw[i, j] is input to the memory cell MC[i, j] through the wiring RW[i]. The memory cell MC[i, j] has a function of holding a third analog potential corresponding to the first analog potential Vx[i, j] and the second analog potential Vw[i, j]. The memory cell MC[i, j] also has a function of generating a second analog current corresponding to the third analog potential. This means that here, the current I[i, j] in the memory cell MC[i, j] corresponds to the second analog current.

Furthermore, in the product-sum operation circuit 10 in FIG. 8, a second analog potential Vw[i+1, j] is input to the memory cell MC[i+1, j] through the wiring RW[i+1]. The memory cell MC[i+1, j] has a function of holding a third analog potential corresponding to the first analog potential Vx[i+1, j] and the second analog potential Vw[i+1, j]. The memory cell MC[i+1, j] also has a function of generating a second analog current corresponding to the third analog potential. This means that here, the current I[i+1, j] in the memory cell MC[i+1, j] corresponds to the second analog current.

The current I[i, j] flows between a wiring BL[j] and a wiring VR[j] through the memory cell MC[i, j]. The current I[i+1, j] flows between the wiring BL[j] and the wiring VR[j] through the memory cell MC[i+1, j]. Accordingly, a current I[j], which corresponds to the sum of the current I[i, j] and the current I[i+1, j], flows between the wiring BL[j] and the wiring VR[j] through the memory cell MC[i, j] and the memory cell MC[i+1, j].

The reference memory circuit 12 includes memory cells MCR such as a memory cell MCR[i] and a memory cell MCR[i+1]. A first reference potential VPR is input to the memory cell MCR through a wiring WDREF. The memory cell MCR has a function of generating a first reference current corresponding to the first reference potential VPR. Hereinafter, a current flowing into the memory cell MCR[i] is denoted by IREF[i], and a current flowing into the memory cell MCR[i+1] is denoted by IREF[i+1].

Specifically, in the product-sum operation circuit 10 in FIG. 8, the first reference potential VPR is input to the memory cell MCR[i] through the wiring WDREF. The memory cell MCR[i] has a function of generating the first reference current corresponding to the first reference potential VPR. This means that here, the current IREF[i] in the memory cell MCR[i] corresponds to the first reference current.

Furthermore, in the product-sum operation circuit 10 in FIG. 8, the first reference potential VPR is input to the memory cell MCR[i+1] through the wiring WDREF. The memory cell MCR[i+1] has a function of generating the first reference current corresponding to the first reference potential VPR. This means that here, the current IREF[i+1] in the memory cell MCR[i+1] corresponds to the first reference current.

The memory cell MCR has a function of holding the first reference potential VPR. In other words, the memory cell MCR has a function of holding the first reference current corresponding to the first reference potential VPR by holding the first reference potential VPR.

Moreover, the second analog potential is input to the memory cell MCR through the wiring RW such as the wiring RW[i] or the wiring RW[i+1]. The memory cell MCR has a function of adding the second analog potential or a potential corresponding to the second analog potential to the first reference potential VPR that has been held, and a function of holding a second reference potential obtained by the addition. The memory cell MCR also has a function of generating a second reference current corresponding to the second reference potential. In other words, the memory cell MCR has a function of holding the second reference current corresponding to the second reference potential by holding the second reference potential.

Specifically, in the product-sum operation circuit 10 in FIG. 8, the second analog potential Vw[i, j] is input to the memory cell MCR[i] through the wiring RW[i]. The memory cell MCR[i] has a function of holding a second reference potential corresponding to the first reference potential VPR and the second analog potential Vw[i, j]. The memory cell MCR[i] also has a function of generating a second reference current corresponding to the second reference potential. This means that here, the current IREF[i] in the memory cell MCR[i] corresponds to the second reference current.

Furthermore, in the product-sum operation circuit 10 in FIG. 8, the second analog potential Vw[i+1, j] is input to the memory cell MCR[i+1] through the wiring RW[i+1]. The memory cell MCR[i+1] has a function of holding a second reference potential corresponding to the first reference potential VPR and the second analog potential Vw[i+1, j]. The memory cell MCR[i+1] also has a function of generating a second reference current corresponding to the second reference current. This means that here, the current IREF[i+1] in the memory cell MCR[i+1] corresponds to the second reference current.

The current IREF[i] flows between a wiring BLREF and a wiring VRREF through the memory cell MCR[i]. The current IREF[i+1] flows between the wiring BLREF and the wiring VRREF through the memory cell MCR[i+1]. Accordingly, a current IREF, which corresponds to the sum of the current IREF[i] and the current IREF[i+1], flows between the wiring BLREF and the wiring VRREF through the memory cell MCR[i] and the memory cell MCR[i+1].

The current supply circuit 15 has a function of supplying a current with the same value as the current IREF that flows through the wiring BLREF or supplying a current corresponding to the current IREF to a wiring BL. In the case where an offset current described later is set when the current I[j] that flows between the wiring BL[j] and the wiring VR[j] through the memory cell MC[i, j] and the memory cell MC[i+1, j] is different from the current IREF that flows between the wiring BLREF and the wiring VRREF through the memory cell MCR[i] and the memory cell MCR[i+1], a current corresponding to the difference flows to the current source circuit 13 or the current sink circuit 14.

Specifically, when the current I[j] is higher than the current IREF, the current source circuit 13 has a function of generating a current ΔI[j] that corresponds to the difference between the current I[j] and the current IREF. The current source circuit 13 also has a function of supplying the generated current ΔI[j] to the wiring BL[j]. This means that the current source circuit 13 has a function of holding the current ΔI[j].

When the current I[j] is lower than the current IREF, the current sink circuit 14 has a function of generating the current ΔI[j], which corresponds to the difference between the current I[j] and the current IREF. The current sink circuit 14 also has a function of drawing the generated current ΔI[j] through the wiring BL[j]. This means that the current sink circuit 14 has a function of holding the current ΔI[j].

Next, an example of the operation of the product-sum operation circuit 10 illustrated in FIG. 8 will be described.

First, a potential corresponding to the first analog potential is stored in the memory cell MC[i, j]. Specifically, a potential VPR−Vx[i, j] that is obtained by subtracting a first analog potential Vx[i, j] from the first reference potential VPR is input to the memory cell MC[i, j] through the wiring WD[j]. The memory cell MC[i, j] holds the potential VPR−Vx[i, j]. In addition, the memory cell MC[i, j] generates the current I[i, j] that corresponds to the potential VPR−Vx[i, j]. For example, the first reference potential VPR is a high-level potential that is higher than a ground potential. Specifically, the first reference potential VPR is preferably higher than the ground potential and substantially the same as or lower than a high-level potential VDD that is supplied to the current supply circuit 15.

Moreover, the first reference potential VPR is stored in the memory cell MCR[i]. Specifically, the potential VPR is input to the memory cell MCR[i] through the wiring WDREF. The memory cell MCR[i] holds the potential VPR. In addition, the memory cell MCR[i] generates the current IREF[i] that corresponds to the potential VPR.

Furthermore, a potential corresponding to the first analog potential is stored in the memory cell MC[i+1, j]. Specifically, a potential VPR−Vx[i+1, j] that is obtained by subtracting the first analog potential Vx[i+1, j] from the first reference potential VPR is input to the memory cell MC[i+1, j] through the wiring WD[j]. The memory cell MC[i+1, j] holds the potential VPR−Vx[i+1, j]. In addition, the memory cell MC[i+1, j] generates the current I[i+1, j] that corresponds to the potential VPR−Vx[i+1, j].

Moreover, the first reference potential VPR is stored in the memory cell MCR[i+1]. Specifically, the potential VPR is input to the memory cell MCR[i+1] through the wiring WDREF. The memory cell MCR[i+1] holds the potential VPR. In addition, the memory cell MCR[i+1] generates the current IREF[i+1] that corresponds to the potential VPR.

During the above operation, the wiring RW[i] and the wiring RW[i+1] are set to a standard potential. Examples of the standard potential include the ground potential and a low-level potential VSS that is lower than the ground potential. Alternatively, the standard potential can be a potential between the potential VSS and the potential VDD. This is preferable because the potential of the wiring RW can be higher than the ground potential regardless of whether the second analog potential Vw is positive or negative, which enables easy generation of signals and multiplication of positive and negative potentials.

As a result of the above operation, a current corresponding to the sum of currents generated in the memory cells MC connected to the wiring BL[j] flows through the wiring BL[j]. Specifically, in FIG. 8, the current I[j], which is the sum of the current I[i, j] generated in the memory cell MC[i, j] and the current I[i+1, j] generated in the memory cell MC[i+1, j], flows through the wiring BL[j]. In addition, as a result of the above operation, a current corresponding to the sum of currents generated in the memory cells MCR connected to the wiring BLREF flows through the wiring BLREF. Specifically, in FIG. 8, the current IREF, which is the sum of the current IREF[i] generated in the memory cell MCR[i] and the current IREF[i+1] generated in the memory cell MCR[i+1], flows through the wiring BLREF.

Next, an offset current Ioffset[j] that is the difference between the current I[j] obtained by inputting the first analog potential and the current IREF obtained by inputting the first reference potential is held in the current source circuit 13 or the current sink circuit 14 while the wiring RW[i] and the wiring RW[i+1] are kept at the standard potential.

Specifically, when the current I[j] is higher than the current IREF, the current source circuit 13 supplies the current Ioffset[j] to the wiring BL[j]. This means that a current ICM[j] that flows into the current source circuit 13 corresponds to the current Ioffset[j]. The value of the current ICM[j] is held in the current source circuit 13. When the current I[j] is lower than the current IREF, the current sink circuit 14 draws the current Ioffset[j] through the wiring BL[j]. This means that a current ICP[j] that flows into the current sink circuit 14 corresponds to the current Ioffset[j]. The value of the current ICP[j] is held in the current sink circuit 14.

Then, the second analog potential or a potential corresponding to the second analog potential is stored in the memory cell MC[i, j] so as to be added to the first analog potential or a potential corresponding to the first analog potential that has been held in the memory cell MC[i, j]. Specifically, the potential of the wiring RW[i] is set higher than the standard potential by Vw[i], whereby a second analog potential Vw[i] is input to the memory cell MC[i, j] through the wiring RW[i]. The memory cell MC[i, j] holds a potential VPR−Vx[i, j]+Vw[i]. Moreover, the memory cell MC[i, j] generates the current I[i, j] corresponding to the potential VPR−Vx[i, j]+Vw[i].

In addition, the second analog potential or a potential corresponding to the second analog potential is stored in the memory cell MC[i+1, j] so as to be added to the first analog potential or a potential corresponding to the first analog potential that has been held in the memory cell MC[i+1, j]. Specifically, the potential of the wiring RW[i+1] is set higher than the standard potential by Vw[i+1], whereby a second analog potential Vw[i+1] is input to the memory cell MC[i+1, j] through the wiring RW[i+1]. The memory cell MC[i+1, j] holds a potential VPR−Vx[i+1, j]+Vw[i+1]. Moreover, the memory cell MC[i+1, j] generates the current I[i+1, j] corresponding to the potential VPR−Vx[i+1, j]+Vw[i+1].

When the transistor Tr1 that operates in a saturation region is used as an element for converting a potential into a current, the drain current of the transistor Tr1 included in the memory cell MC[i, j] corresponds to the current I[i, j]. Thus, the second analog current is expressed by the following Formula 10, given that the potential of the wiring RW[i] is Vw[i] and the potential of the wiring RW[i+1] is Vw[i+1]. Note that k is a coefficient, and Vth is the threshold voltage of the transistor Tr1.

[Formula 10]

$$I[i,j]=k(Vw[i]-Vth+VPR-Vx[i,j])^2 \quad (10)$$

Since the drain current of the transistor Tr1 included in the memory cell MCR[i] corresponds to the current IREF[i], the second reference current is expressed by Formula 11.

[Formula 11]

$$IREF[i]=k(Vw[i]-Vth+VPR)^2 \quad (11)$$

The current I[j], which corresponds to the sum of the current I[i, j] flowing into the memory cell MC[i, j] and the current I[i+1, j] flowing into the memory cell MC[i+1, j], is expressed as ΣiI[i, j]. The current IREF, which corresponds to the sum of the current IREF[i] flowing into the memory cell MCR[i] and the current IREF[i+1] flowing into the memory cell MCR[i+1], is expressed as ΣiIREF[i]. Accordingly, the current ΔI[j] that corresponds to the difference between the current I[j] and the current IREF is expressed by Formula 12.

[Formula 12]

$$\Delta I[j]=IREF-I[j]=\Sigma i IREF[i]-\Sigma i I[i,j] \quad (12)$$

The current ΔI[j] is obtained from Formulae 10 to 12, as expressed by Formula 13 below.

[Formula 13]

$$\Delta I[j] = \Sigma i \left\{ k(Vw[i]-Vth+VPR)^2 - k\left(\begin{array}{c} Vw[i]-Vth+ \\ VPR-Vx[i,j] \end{array}\right)^2 \right\} \quad (13)$$
$$= 2k\Sigma i(Vw[i] \cdot Vx[i,j]) - 2k\Sigma i(Vth-VPR) \cdot Vx[i,j] -$$
$$k\Sigma i Vx[i,j]^2$$

The term 2kΣi(Vw[i]·Vx[i, j]) in Formula 13 corresponds to the sum of the product of the first analog potential Vx[i, j] and the second analog potential Vw[i] and the product of the first analog potential Vx[i+1, j] and the second analog potential Vw[i+1].

Given that the current Ioffset[j] is defined as the current ΔI[j] at the time when the potential of the wirings RW are set to the standard potential, that is, when the second analog potential Vw[i] and the second analog potential Vw[i+1] are both 0, the following Formula 14 is obtained from Formula 13.

[Formula 14]

$$Ioffset[j]=2k\Sigma i(Vth-VPR) \cdot Vx[i,j]-k\Sigma i Vx[i,j]^2 \quad (14)$$

It is thus found from Formulae 12 to 14 that 2kΣi(Vw[i]·Vx[i, j]) that corresponds to the product-sum of the first analog current and the second analog current is expressed by Formula 15.

[Formula 15]

$$2k\Sigma i(Vw[i] \cdot Vx[i,j])=IREF-I[j]-Ioffset[j] \quad (15)$$

When the potential of the wiring RW[i] is Vw[i] and the potential of the wiring RW[i+1] is Vw[i+1], a current Iout[j] that flows from the wiring BL[j] is expressed by IREF−I[j]−Ioffset[j], where I[j] is the sum of currents flowing into the memory cells MC, IREF is the sum of currents flowing into the memory cells MCR, and Ioffset[j] is a current flowing into the current source circuit 13 or the current sink circuit 14. According to Formula 15, the current Iout[j] equals to 2kΣi(Vw[i]·Vx[i, j]), which corresponds to the sum of the product of the first analog potential Vx[i, j] and the second analog potential Vw[i] and the product of the first analog potential Vx[i+1, j] and the second analog potential Vw[i+1].

The transistor Tr1 preferably operates in a saturation region. However, even if the operation region of the transistor Tr1 deviates from an ideal saturation region, the transistor Tr1 is regarded as operating in a saturation region as long as there is no problem in obtaining a current that corresponds to the sum of the product of the first analog potential Vx[i, j] and the second analog potential Vw[i] and the product of the first analog potential Vx[i+1, j] and the second analog potential Vw[i+1] with an accuracy within a desired range.

With the configuration illustrated in FIG. 8, the product-sum operation circuit can perform arithmetic processing on analog data without converting analog data into digital data; thus, the circuit scale of a semiconductor device can be reduced or the time required for the arithmetic processing of analog data can be shortened. Alternatively, with the configuration of the product-sum operation circuit illustrated in FIG. 8, power consumption of a semiconductor device can be reduced while the time required for arithmetic processing of analog data is shortened.

Next, specific configuration examples of the memory circuit 11, the reference memory circuit 12, the current source circuit 13, the current sink circuit 14, and the current supply circuit 15 will be described with reference to FIG. 9.

Figure 9:
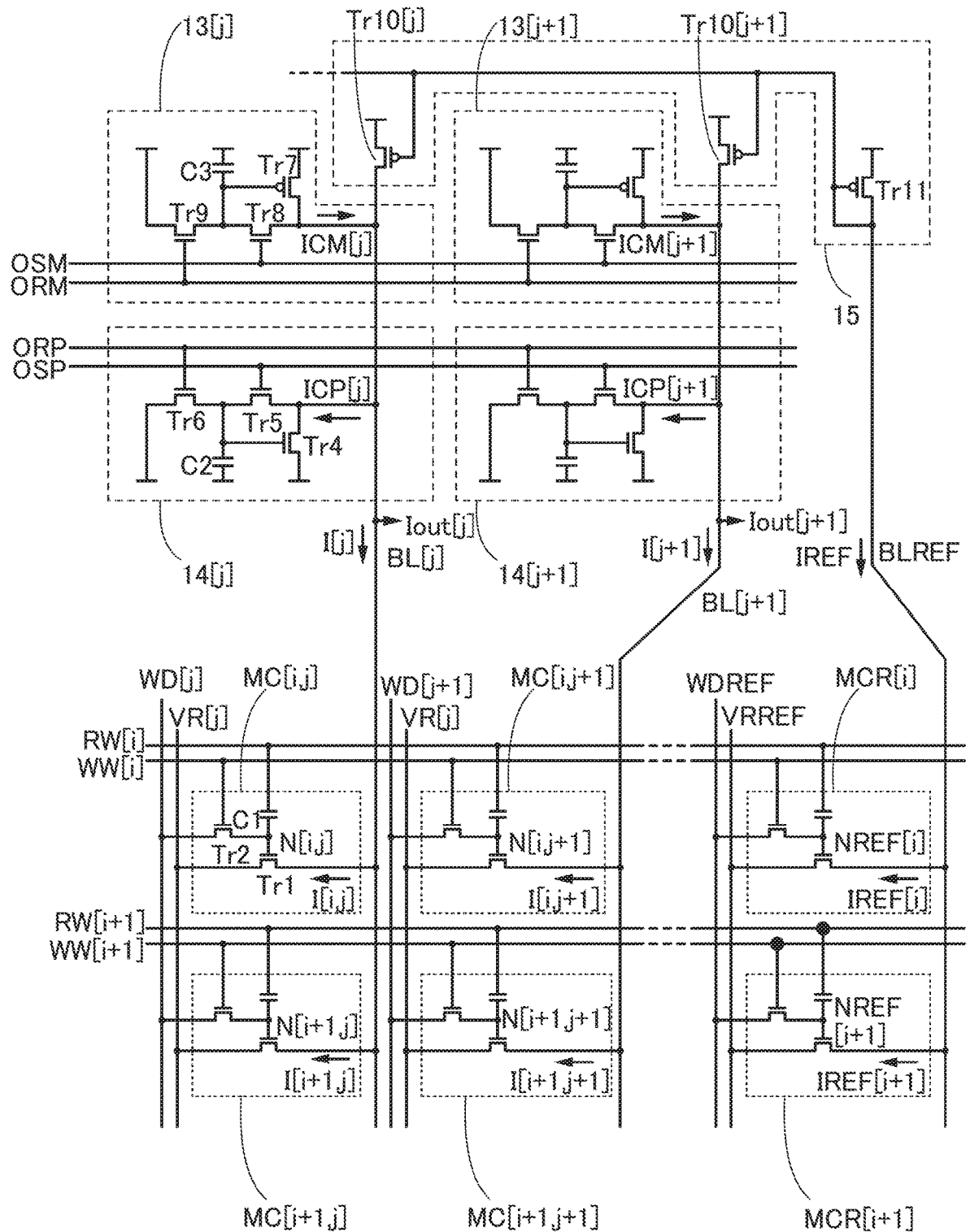
FIG. 9 illustrates a configuration of a product-sum operation circuit included in a display system.

FIG. 9 shows an example of a specific circuit configuration of memory cells MC in given two rows and two columns and memory cells MCR in given two rows and one column, and a connection relation between these memory cells. Specifically, FIG. 9 illustrates the memory cell MC[i, j] in the i-th row and the j-th column, the memory cell MC[i+1, j] in the (i+1)th row and the j-th column, a memory cell MC[i, j+1] in the i-th row and the (j+1)th column, and a memory cell MC[i+1, j+1] in the (i+1)th row and the (j+1)th column. FIG. 9 also illustrates the memory cell MCR[i] in the i-th row and the memory cell MCR[i+1] in the (i+1)th row.

The memory cell MC[i, j], the memory cell MC[i, j+1], and the memory cell MCR[i] in the i-th row are connected to the wiring RW[i] and a wiring WW[i]. The memory cell MC[i+1, j], the memory cell MC[i+1, j+1], and the memory cell MCR[i+1] in the (i+1)th row are connected to the wiring RW[i+1] and a wiring WW[i+1].

The memory cell MC[i, j] and the memory cell MC[i+1, j] in the j-th column are connected to the wiring WD[j], the wiring VR[j], and the wiring BL[j]. The memory cell MC[i, j+1] and the memory cell MC[i+1, j+1] in the (j+1)th column are connected to a wiring WD[j+1], a wiring VR[j+1], and a wiring BL[j+1]. The memory cell MCR[i] in the i-th row and the memory cell MCR[i+1] in the (i+1)th row are connected to the wiring WDREF, the wiring VRREF, and the wiring BLREF.

The memory cells MC and MCR each include the transistor Tr1, a transistor Tr2, and a capacitor C1. The transistor Tr2 has a function of controlling the input of the first analog potential to the memory cell MC or the memory cell MCR. The transistor Tr1 has a function of generating an analog current in accordance with a potential input to its gate. The capacitor C1 has a function of adding the second analog potential or a potential corresponding to the second analog potential to the first analog potential or a potential corresponding to the first analog potential that is held in the memory cell MC or the memory cell MCR.

Specifically, in the memory cell MC illustrated in FIG. 9, a gate of the transistor Tr2 is connected to the wiring WW, one of a source and a drain of the transistor Tr2 is connected to the wiring WD, and the other of the source and the drain of the transistor Tr2 is connected to the gate of the transistor Tr1. One of a source and a drain of the transistor Tr1 is connected to the wiring VR, and the other of the source and the drain of the transistor Tr1 connected to the wiring BL. A first electrode of the capacitor C1 is connected to the wiring RW, and a second electrode of the capacitor C1 is connected to the gate of the transistor Tr1.

In the memory cell MCR illustrated in FIG. 9, the gate of the transistor Tr2 is connected to the wiring WW, one of the source and the drain of the transistor Tr2 is connected to the wiring WDREF, and the other of the source and the drain of the transistor Tr2 is connected to the gate of the transistor Tr1. One of the source and the drain of the transistor Tr1 is connected to the wiring VRREF, and the other of the source and the drain of the transistor Tr1 is connected to the wiring BLREF. The first electrode of the capacitor C1 is connected to the wiring RW, and the second electrode of the capacitor C1 is connected to the gate of the transistor Tr1.

The gate of the transistor Tr1 in the memory cell MC is referred to as a node N here. In the memory cell MC, the first analog potential or a potential corresponding to the first analog potential is input to the node N through the transistor Tr2. Then, when the transistor Tr2 is turned off, the node N is brought into a floating state and the first analog potential or the potential corresponding to the first analog potential is held at the node N. In the memory cell MC, when the node N is brought into a floating state, the second analog potential or a potential corresponding to the second analog potential that is input to the first electrode of the capacitor C1 is supplied to the node N. As a result of the above operation, the node N can have a potential obtained by adding the second analog potential or the potential corresponding to the second analog potential to the first analog potential or the potential corresponding to the first analog potential.

Since the potential of the first electrode of the capacitor C1 is supplied to the node N through the capacitor C1, the amount of change in the potential of the node N is not exactly the same as the amount of change in the potential of the first electrode in an actual circuit. Specifically, the accurate amount of change in the potential of the node N can be calculated in the following manner: a coupling coefficient that is uniquely determined by the capacitance of the capacitor C1, the gate capacitance of the transistor Tr1, and a parasitic capacitance is multiplied by the amount of change in the potential of the first electrode. In the following description, for easy understanding, the amount of change in the potential of the node N is assumed to be substantially the same as the amount of change in the potential of the first electrode.

The drain current of the transistor Tr1 is determined in accordance with the potential of the node N. Thus, when the transistor Tr2 is turned off, the value of the drain current of the transistor Tr1 as well as the potential of the node N is held. The drain current is affected by the first analog potential and the second analog potential.

The gate of the transistor Tr1 in the memory cell MCR is referred to as a node NREF here. In the memory cell MCR, the first reference potential or a potential corresponding to the first reference potential is input to the node NREF through the transistor Tr2. Then, when the transistor Tr2 is turned off, the node NREF is brought into a floating state and the first reference potential or the potential corresponding to the first reference potential is held at the node NREF. In the memory cell MCR, when the node NREF is brought into a floating state, the second analog potential or a potential corresponding to the second analog potential that is input to the first electrode of the capacitor C1 is supplied to the node NREF. As a result of the above operation, the node NREF can have a potential obtained by adding the second analog potential or the potential corresponding to the second analog potential to the first reference potential or the potential corresponding to the first reference potential.

The drain current of the transistor Tr1 is determined in accordance with the potential of the node NREF. Thus, when the transistor Tr2 is turned off, the value the drain current of the transistor Tr1 as well as the potential of the node NREF is held. The drain current is affected by the first reference potential and the second analog potential.

When the drain current of the transistor Tr1 in the memory cell MC[i, j] is the current I[i, j] and the drain current of the transistor Tr1 in the memory cell MC[i+1, j] is the current I[i+1, j], the sum of currents supplied to the memory cell MC[i, j] and the memory cell MC[i+1, j] through the wiring BL[j] is the current I[j]. When the drain current of the transistor Tr1 in the memory cell MC[i, j+1] is a current I[i, j+1] and the drain current of the transistor Tr1 in the memory cell MC[i+1, j+1] is a current I[i+1, j+1], the sum of currents supplied to the memory cell MC[i, j+1] and the memory cell MC[i+1, j+1] through the wiring BL[j+1] is a current I[j+1]. When the drain current of the transistor Tr1 in the memory cell MCR[i] is the current IREF[i] and the drain current of the transistor Tr1 in the memory cell MCR[i+1] is the current IREF[i+1], the sum of currents supplied to the memory cell MCR[i] and the memory cell MCR[i+1] through the wiring BLREF is the current IREF.

The current source circuit 13 illustrated in FIG. 9 includes a current source circuit 13[j] for the memory cells MC in the j-th column and a current source circuit 13[j+1] for the memory cells MC in the (j+1)th column. The current sink circuit 14 illustrated in FIG. 9 includes a current sink circuit 14[j] for the memory cells MC in the j-th column and a current sink circuit 14[j+1] for the memory cells MC in the (j+1)th column.

The current source circuit 13[j] and the current sink circuit 14[j] are connected to the wiring BL[j]. The current source circuit 13[j+1] and the current sink circuit 14[j+1] are connected to the wiring BL[j+1].

The current supply circuit 15 is connected to the wiring BL[j], the wiring BL[j+1], and the wiring BLREF. The current supply circuit 15 has a function of supplying the current IREF to the wiring BLREF, and a function of supplying a current that is the same as the current IREF or a current that corresponds to the current IREF to each of the wiring BL[j] and the wiring BL[j+1].

Specifically, the current source circuit 13[j] and the current source circuit 13[j+1] each include a transistor Tr7, a transistor Tr8, a transistor Tr9, and a capacitor C3. In the case of setting the offset current, the transistor Tr7 in the current source circuit 13[j] has a function of generating the current ICM[j] that corresponds to the difference between the current I[j] and the current IREF, when the current I[j] is higher than the current IREF; the transistor Tr7 in the current source circuit 13[j+1] has a function of generating a current ICM[j+1] that corresponds to the difference between the current I[j+1] and the current IREF, when the current I[j+1] is higher than the current IREF. The current ICM[j] and the current ICM[j+1] are supplied from the current source circuit 13[j] and the current source circuit 13[j+1] to the wiring BL[j] and the wiring BL[j+1], respectively.

In each of the current source circuit 13[j] and the current source circuit 13[j+1], one of a source and a drain of the transistor Tr7 is connected to the wiring BL, and the other of the source and the drain is connected to a wiring supplied with a predetermined potential. One of a source and a drain of the transistor Tr8 is connected to the wiring BL, and the other of the source and the drain is connected to a gate of the transistor Tr7. One of a source and a drain of the transistor Tr9 is connected to the gate of the transistor Tr7, and the other of the source and the drain is connected to a wiring supplied with a predetermined potential. A first electrode of the capacitor C3 is connected to the gate of the transistor Tr7, and a second electrode of the capacitor C3 is connected to a wiring supplied with a predetermined potential.

A gate of the transistor Tr8 is connected to a wiring OSM, and a gate of the transistor Tr9 is connected to a wiring ORM.

Note that FIG. 9 illustrates an example where the transistor Tr7 is a p-channel transistor and the transistors Tr8 and Tr9 are n-channel transistors.

The current sink circuit 14[j] and the current sink circuit 14[j+1] each include a transistor Tr4, a transistor Tr5, a transistor Tr6, and a capacitor C4. In the case of setting the offset current, the transistor Tr4 in the current sink circuit 14[j] has a function of generating the current ICP[j] that corresponds to the difference between the current I[j] and the current IREF, when the current I[j] is lower than the current IREF; the transistor Tr4 in the current sink circuit 14[j+1] has a function of generating a current ICP[j+1] that corresponds to the difference between the current I[j+1] and the current IREF, when the current I[j+1] is lower than the current IREF. The current ICP[j] and the current ICP[j+1] are drawn from the wiring BL[j] and the wiring BL[j+1] into the current sink circuit 14[j] and the current sink circuit 14[j+1], respectively.

Note that the current ICM[j] and the current ICP[j] each correspond to Ioffset[j], and the current ICM[j+1] and the current ICP[j+1] each correspond to Ioffset[j+1].

In each of the current sink circuit 14[j] and the current sink circuit 14[j+1], one of a source and a drain of the transistor Tr4 is connected to the wiring BL, and the other of the source and the drain is connected to a wiring supplied with a predetermined potential. One of a source and a drain of the transistor Tr5 is connected to the wiring BL, and the other of the source and the drain is connected to a gate of the transistor Tr4. One of a source and a drain of the transistor Tr6 is connected to the gate of the transistor Tr4, and the other of the source and the drain is connected to a wiring supplied with a predetermined potential. A first electrode of the capacitor C4 is connected to the gate of the transistor Tr4, and a second electrode of the capacitor C4 is connected to a wiring supplied with a predetermined potential.

A gate of the transistor Tr5 is connected to a wiring OSP, and a gate of the transistor Tr6 is connected to a wiring ORP.

Note that FIG. 9 illustrates an example where the transistors Tr4 to Tr6 are n-channel transistors.

The current supply circuit 15 includes a transistor Tr10 for the wiring BL and a transistor Tr11 for the wiring BLREF. Specifically, FIG. 9 illustrates an example where the current supply circuit 15 includes, as the transistor Tr10, a transistor Tr10[j] for the wiring BL[j] and a transistor Tr10[j+1] for the wiring BL[j+1].

A gate of the transistor Tr10 is connected to a gate of the transistor Tr11. One of a source and a drain of the transistor Tr10 is connected to the wiring BL, and the other of the source and the drain is connected to a wiring supplied with a predetermined potential. One of a source and a drain of the transistor Tr11 is connected to the wiring BLREF, and the other of the source and the drain is connected to a wiring supplied with a predetermined potential.

The transistors Tr10 and Tr11 have the same polarity. FIG. 9 shows an example where the transistors Tr10 and Tr11 are p-channel transistors.

The drain current of the transistor Tr11 corresponds to the current IREF. The transistor Tr10 and the transistor Tr11 collectively function as a current mirror circuit; thus, the drain current of the transistor Tr10 is substantially the same as the drain current of the transistor Tr11 or corresponds to the drain current of the transistor Tr11.

Next, an example of specific operation of the product-sum operation circuit 10 will be described with reference to FIG. 9 and FIG. 10.

Figure 10:
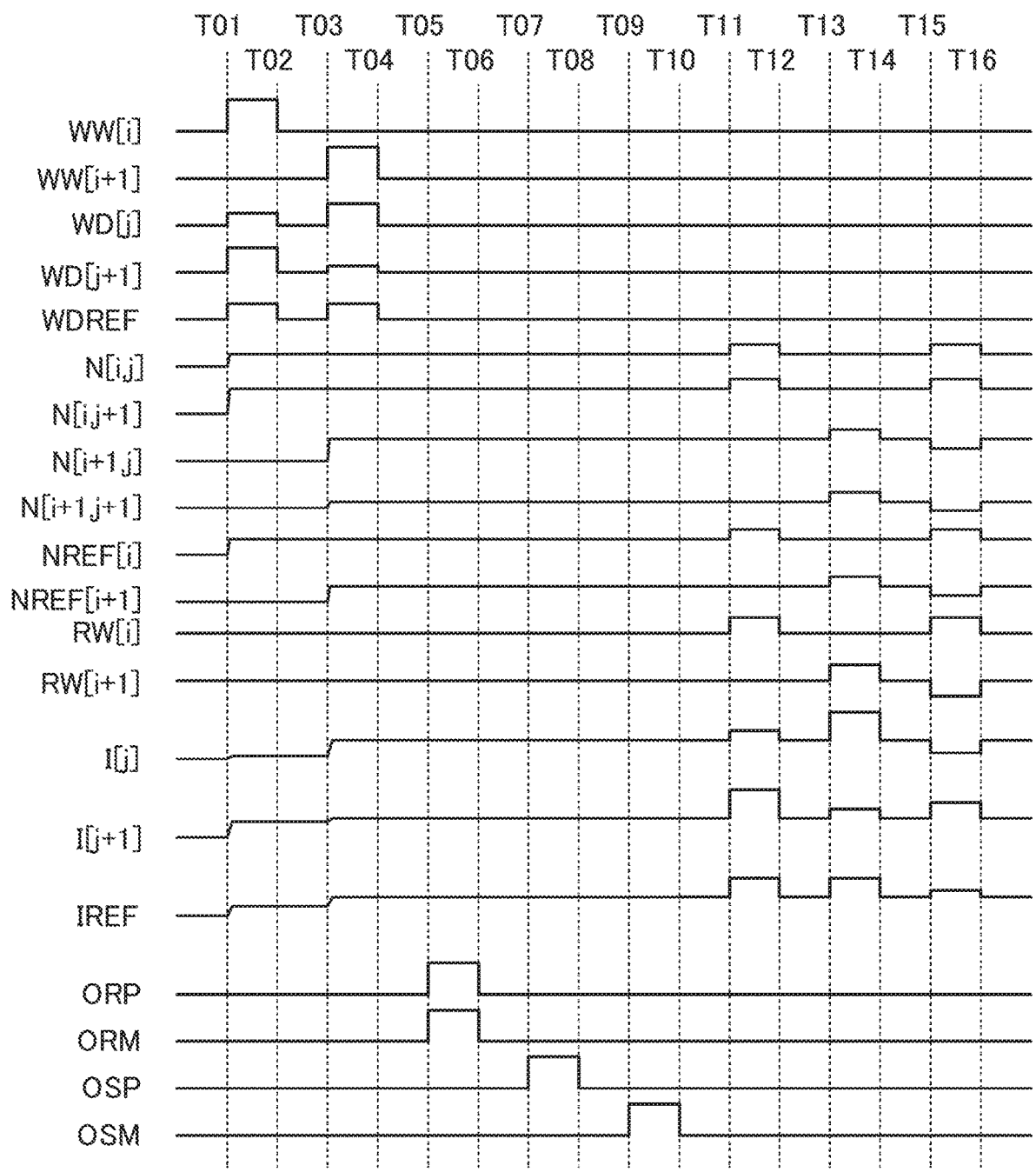
FIG. 10 is a diagram for explaining a structure of a product-sum operation circuit included in a display system.

FIG. 10 is an example of a timing chart showing the operation of the memory cells MC, the memory cells MCR, the current source circuit 13, the current sink circuit 14, and the current supply circuit 15 illustrated in FIG. 9. In FIG. 10, from Time T01 to Time T04, the first analog current is stored in the memory cells MC and the memory cells MCR. From Time T05 to Time T10, the value of the offset current Ioffset that is supplied from the current source circuit 13 and the current sink circuit 14 is set. From Time T11 to Time T16, data corresponding to the product-sum of the first analog current and the second analog current is acquired.

Note that a low-level potential is supplied to the wiring VR[j] and the wiring VR[j+1]. The high-level potential VDD is supplied to all wirings having a predetermined potential that are connected to the current source circuit 13. The low-level potential VSS is supplied to all wirings having a predetermined potential that are connected to the current sink circuit 14. The high-level potential VDD is supplied to all wirings having a predetermined potential that are connected to the current supply circuit 15.

Each of the transistors Tr1, Tr4, Tr7, Tr10[j], Tr10[j+1], and Tr11 operates in a saturation region.

First, from Time T01 to Time T02, a high-level potential is supplied to the wiring WW[i] and a low-level potential is supplied to the wiring WW[i+1]. Accordingly, the transistors Tr2 in the memory cell MC[i, j], the memory cell MC[i, j+1], and the memory cell MCR[i] illustrated in FIG. 9 are turned on. The transistors Tr2 in the memory cell MC[i+1, j], the memory cell MC[i+1, j+1], and the memory cell MCR[i+1] remain off.

In addition, from Time T01 to Time T02, a potential obtained by subtracting the first analog potential from the first reference potential VPR is supplied to each of the wiring WD[j] and the wiring WD[j+1] in FIG. 9. Specifically, the potential VPR−Vx[i, j] is supplied to the wiring WD[j], and a potential VPR−Vx[i, j+1] is supplied to the wiring WD[j+1]. The first reference potential VPR is supplied to the wiring WDREF, and a potential between the potential VSS and the potential VDD, e.g., a potential (VDD+VSS)/2, is supplied as the standard potential to the wiring RW[i] and the wiring RW[i+1].

Accordingly, the potential VPR−Vx[i, j] is supplied to a node N[i, j] through the transistor Tr2 in the memory cell MC[i, j] illustrated in FIG. 9, the potential VPR−Vx[i, j+1] is supplied to a node N[i, j+1] through the transistor Tr2 in the memory cell MC[i, j+1], and the potential VPR is supplied to a node NREF[i] through the transistor Tr2 in the memory cell MCR[i].

After Time T02, the potential supplied to the wiring WW[i] illustrated in FIG. 9 changes from a high-level potential to a low-level potential, so that the transistors Tr2 in the memory cell MC[i, j], the memory cell MC[i, j+1], and the memory cell MCR[i] are turned off. Accordingly, the potential VPR−Vx[i, j] is held at the node N[i, j], the potential VPR−Vx[i, j+1] is held at the node N[i, j+1], and the potential VPR is held at the node NREF[i].

Then, from Time T03 to Time T04, the potential of the wiring WW[i] illustrated in FIG. 9 remains at a low level and a high-level potential is supplied to the wiring WW[i+1]. Accordingly, the transistors Tr2 in the memory cell MC[i+1, j], the memory cell MC[i+1, j+1], and the memory cell MCR[i+1] illustrated in FIG. 9 are turned on. The transistors Tr2 in the memory cell MC[i, j], the memory cell MC[i, j+1], and the memory cell MCR[i] remain off.

Furthermore, from Time T03 to Time T04, a potential obtained by subtracting the first analog potential from the first reference potential VPR is supplied to each of the wiring WD[j] and the wiring WD[j+1] illustrated in FIG. 9. Specifically, the potential VPR−Vx[i+1, j] is supplied to the wiring WD[j], and a potential VPR−Vx[i+1, j+1] is supplied to the wiring WD[j+1]. The first reference potential VPR is supplied to the wiring WDREF, and a potential between the potential VSS and the potential VDD, e.g., the potential (VDD+VSS)/2, is supplied as the standard potential to the wiring RW[i] and the wiring RW[i+1].

Accordingly, the potential VPR−Vx[i+1, j] is supplied to a node N[i+1, j] through the transistor Tr2 in the memory cell MC[i+1, j] illustrated in FIG. 9, the potential VPR−Vx[i+1, j+1] is supplied to a node N[i+1, j+1] through the transistor Tr2 in the memory cell MC[i+1, j+1], and the potential VPR is supplied to a node NREF[i+1] through the transistor Tr2 in the memory cell MCR[i+1].

After Time T04, the potential supplied to the wiring WW[i+1] in FIG. 9 changes from a high-level potential to a low-level potential, so that the transistors Tr2 in the memory cell MC[i+1, j], the memory cell MC[i+1, j+1], and the memory cell MCR[i+1] are turned off. Accordingly, the potential VPR−Vx[i+1, j] is held at the node N[i+1, j], the potential VPR−Vx[i+1, j+1] is held at the node N[i+1, j+1], and the potential VPR is held at the node NREF[i+1].

Next, from Time T05 to Time T06, a high-level potential is supplied to the wiring ORP and the wiring ORM illustrated in FIG. 9. When a high-level potential is supplied to the wiring ORM, the transistors Tr9 in the current source circuit 13[j] and the current source circuit 13[j+1] in FIG. 9 are turned on, so that the gates of the transistors Tr7 are reset by the potential VDD supplied thereto. Moreover, when a high-level potential is supplied to the wiring ORP, the transistors Tr6 in the current sink circuit 14[j] and the current sink circuit 14[j+1] in FIG. 9 are turned on, so that the gates of the transistors Tr4 are reset by the potential VSS supplied thereto.

After Time T06, the potentials supplied to the wiring ORP and the wiring ORM illustrated in FIG. 9 change from a high-level potential to a low-level potential, so that the transistors Tr9 in the current source circuit 13[j] and the current source circuit 13[j+1] and the transistors Tr6 in the current sink circuit 14[j] and the current sink circuit 14[j+1] are turned off. Accordingly, the potential VDD is held at the gates of the transistors Tr7 in the current source circuit 13[j] and the current source circuit 13[j+1], and the potential VSS is held at the gates of the transistors Tr4 in the current sink circuit 14[j] and the current sink circuit 14[j+1].

Then, from Time T07 to Time T08, a high-level potential is supplied to the wiring OSP illustrated in FIG. 9. Furthermore, a potential between the potential VSS and the potential VDD, e.g., the potential (VDD+VSS)/2, is supplied as the standard potential to each of the wiring RW[i] and the wiring RW[i+1] illustrated in FIG. 9. By supply of a high-level potential to the wiring OSP, the transistors Tr5 in the current sink circuit 14[j] and the current sink circuit 14[j+1] are turned on.

If the current I[j] flowing through the wiring BL[j] is lower than the current IREF flowing through the wiring BLREF, that is, if the current ΔI[j] has a positive value, this means that the sum of a current that can be drawn by the transistor Tr1 in the memory cell MC[i, j] in FIG. 9 and a current that can be drawn by the transistor Tr1 in the memory cell MC[i+1, j] is smaller than the drain current of the transistor Tr10[j]. Thus, if the current ΔI[j] has a positive value, part of the drain current of the transistor Tr10[j] flows to the gate of the transistor Tr4 when the transistor Tr5 is turned on in the current sink circuit 14[j], and the potential of the gate of the transistor Tr4 starts to rise. Then, when the drain current of the transistor Tr4 becomes substantially equal to the current ΔI[j], the potential of the gate of the transistor Tr4 converges on a certain value. The potential of the gate of the transistor Tr4 at this time corresponds to a potential at which the drain current of the transistor Tr4 becomes the current ΔI[j], i.e., the current Ioffset[j] (=ICP[j]). This means that the transistor Tr4 in the current sink circuit 14[j] is in a state of serving as a current supply that can supply the current ICP[j].

Similarly, if the current I[j+1] flowing through the wiring BL[j+1] is lower than the current IREF flowing through the wiring BLREF, that is, if a current ΔI[j+1] has a positive value, part of the drain current of the transistor Tr10[j+1] flows to the gate of the transistor Tr4 when the transistor Tr5 is turned on in the current sink circuit 14[j+1], and the potential of the gate of the transistor Tr4 starts to rise. Then, when the drain current of the transistor Tr4 becomes substantially equal to the current ΔI[j+1], the potential of the gate of the transistor Tr4 converges on a certain value. The potential of the gate of the transistor Tr4 at this time corresponds to a potential at which the drain current of the transistor Tr4 becomes the current ΔI[j+1], i.e., the current Ioffset[j+1] (=ICP[j+1]). This means that the transistor Tr4 in the current sink circuit 14[j+1] is in a state of serving as a current supply that can supply the current ICP[j+1].

After Time T08, the potential supplied to the wiring OSP in FIG. 9 changes from a high-level potential to a low-level potential, so that the transistors Tr5 in the current sink circuit 14[j] and the current sink circuit 14[j+1] are turned off. Accordingly, the potentials of the gates of the transistors Tr4 are held. Thus, the current sink circuit 14[j] remains in a state of serving as the current supply that can supply the current ICP[j], and the current sink circuit 14[j+1] remains in a state of serving as the current supply that can supply the current ICP[j+1].

Next, from Time T09 to Time T10, a high-level potential is supplied to the wiring OSM in FIG. 9. Furthermore, a potential between the potential VSS and the potential VDD, e.g., the potential (VDD+VSS)/2, is supplied as the standard potential to each of the wiring RW[i] and the wiring RW[i+1] in FIG. 9. By supply of a high-level potential to the wiring OSM, the transistors Tr8 in the current source circuit 13[j] and the current source circuit 13[j+1] are turned on.

If the current I[j] flowing through the wiring BL[j] is higher than the current IREF flowing through the wiring BLREF, that is, if the current ΔI[j] has a negative value, this means that the sum of a current that can be drawn by the transistor Tr1 in the memory cell MC[i, j] in FIG. 9 and a current that can be drawn by the transistor Tr1 in the memory cell MC[i+1, j] is larger than the drain current of the transistor Tr10[j]. Thus, if the current ΔI[j] has a negative value, a current flows from the gate of the transistor Tr7 to the wiring BL[j] when the transistor Tr8 is turned on in the current source circuit 13[j], and the potential of the gate of the transistor Tr7 starts to decrease. Then, when the drain current of the transistor Tr7 becomes substantially equal to the current ΔI[j], the potential of the gate of the transistor Tr7 converges on a certain value. The potential of the gate of the transistor Tr7 at this time corresponds to a potential at which the drain current of the transistor Tr7 becomes the current ΔI[j], i.e., the current Ioffset[j] (=ICM[j]). This means that the transistor Tr7 in the current source circuit 13[j] is in a state of serving as a current supply that can supply the current ICM[j].

Similarly, if the current I[j+1] flowing through the wiring BL[j+1] is higher than the current IREF flowing through the wiring BLREF, that is, if the current ΔI[j+1] has a negative value, a current flows from the gate of the transistor Tr7 in the current source circuit 13[j+1] to the wiring BL[j+1] when the transistor Tr8 is turned on, and the potential of the gate of the transistor Tr7 starts to decrease. Then, when the drain current of the transistor Tr7 becomes substantially equal to the absolute value of the current ΔI[j+1], the potential of the gate of the transistor Tr7 converges on a certain value. The potential of the gate of the transistor Tr7 at this time corresponds to a potential at which the drain current of the transistor Tr7 is equal to the absolute value of the current ΔI[j+1], i.e., the current Ioffset[j+1] (=ICM[j+1]). This means that the transistor Tr7 in the current source circuit 13[j+1] is in a state of serving as a current supply that can supply the current ICM[j+1].

After Time T10, the potential supplied to the wiring OSM in FIG. 9 changes from a high-level potential to a low-level potential, so that the transistors Tr8 in the current source circuit 13[j] and the current source circuit 13[j+1] are turned off. Accordingly, the potentials of the gates of the transistors Tr7 are held. Thus, the current source circuit 13[j] remains in a state of serving as the current supply that can supply the current ICM[j], and the current source circuit 13[j+1] remains in a state of serving as the current supply that can supply the current ICM[j+1].

In each of the current sink circuit 14[j] and the current sink circuit 14[j+1], the transistor Tr4 has a function of drawing a current. Thus, from Time T07 to Time T08, if the current I[j] flowing through the wiring BL[j] is higher than the current IREF flowing through the wiring BLREF and the current ΔI[j] has a negative value, or if the current I[j+1] flowing through the wiring BL[j+1] is higher than the current IREF flowing through the wiring BLREF and the current ΔI[j+1] has a negative value, it might be difficult to supply a proper (neither too much nor too little) amount of current from the current sink circuit 14[j] or the current sink circuit 14[j+1] to the wiring BL[j] or the wiring BL[j+1]. In that case, it might be difficult for the transistor Tr1 in the memory cell MC, the transistor Tr4 in the current sink circuit 14[j] or the current sink circuit 14[j+1], and the transistor Tr10[j] or the transistor Tr10[j+1] to concurrently operate in a saturation region because a balance is struck between the current flowing through the wiring BLREF and the current flowing through the wiring BL[j] or the wiring BL[j+1].

To ensure the operation of the transistor Tr1, the transistor Tr4, and the transistor Tr10[j] or the transistor Tr10[j+1] in a saturation region from Time T07 to Time T08 even when the current ΔI[j] has a negative value, the potential of the gate of the transistor Tr7 may be set to a potential that is high enough to obtain a predetermined drain current, instead of resetting the potential of the gate of the transistor Tr7 to the potential VDD, from Time T05 to Time T06. With this setting, the amount of current that cannot be drawn by the transistor Tr1 can be drawn by the transistor Tr4 to some extent because a current from the transistor Tr7, as well as the drain current of the transistor Tr10[j] or the transistor Tr10[j+1], is supplied. Thus, the operation of the transistor Tr1, the transistor Tr4, and the transistor Tr10[j] or the transistor Tr10[j+1] in a saturation region can be ensured.

Note that if the current I[j] flowing through the wiring BL[j] is lower than the current IREF flowing through the wiring BLREF, that is, if the current ΔI[j] has a positive value from Time T09 to Time T10, since the current sink circuit 14[j] has been set as the current supply that can supply the current ICP[j] from Time T07 to Time T08, the potential of the gate of the transistor Tr7 in the current source circuit 13[j+1] remains substantially the same as the potential VDD. Similarly, if the current I[j+1] flowing through the wiring BL[j+1] is lower than the current IREF flowing through the wiring BLREF, that is, if the current ΔI[j+1] has a positive value, since the current sink circuit 14[j+1] has been set as the current supply that can supply the current ICP[j+1] from Time T07 to Time T08, the potential of the gate of the transistor Tr7 in the current source circuit 13[j+1] remains substantially the same as the potential VDD.

Then, from Time T11 to Time T12, the second analog potential Vw[i] is supplied to the wiring RW[i] illustrated in FIG. 9. Furthermore, a potential between the potential VSS and the potential VDD, e.g., the potential (VDD+VSS)/2, is still supplied as the standard potential to the wiring RW[i+1]. In practice, the potential of the wiring RW[i] is a potential higher than the potential between the potential VSS and the potential VDD (e.g., the potential (VDD+VSS)/2), which is the standard potential, by Vw[i]; for the simplicity of the following description, however, the potential of the wiring RW[i] is assumed to be the potential Vw[i].

When the potential of the wiring RW[i] becomes the potential Vw[i], with the assumption that the amount of change in the potential of the first electrode of the capacitor C1 is substantially the same as the amount of change in the potential of the node N, the potential of the node N in the memory cell MC[i, j] in FIG. 9 becomes VPR−Vx[i, j]+Vw[i] and the potential of the node N in the memory cell MC[i, j+1] becomes VPR−Vx[i, j+1]+Vw[i]. According to Formula 15, the product-sum of the first analog current and the second analog current for the memory cell MC[i, j] affects a current obtained by subtracting the current Ioffset[j] from the current ΔI[j], that is, the current Iout[j] flowing from the wiring BL[j]. Moreover, the product-sum of the first analog current and the second analog current for the memory cell MC[i, j+1] affects a current obtained by subtracting the current Ioffset[j+1] from the current ΔI[j+1], that is, a current Iout[j+1] flowing from the wiring BL[j+1].

After Time T12, a potential between the potential VSS and the potential VDD (e.g., the potential (VDD+VSS)/2), which is the standard potential, is supplied again to the wiring RW[i].

Then, from Time T13 to Time T14, the second analog potential Vw[i+1] is supplied to the wiring RW[i+1] illustrated in FIG. 9. Furthermore, a potential between the potential VSS and the potential VDD, e.g., the potential (VDD+VSS)/2, is still supplied as the standard potential to the wiring RW[i]. In practice, the potential of the wiring RW[i+1] is a potential higher than the potential between the potential VSS and the potential VDD (e.g., the potential (VDD+VSS)/2), which is the standard potential, by Vw[i+1]; for the simplicity of the following description, however, the potential of the wiring RW[i+1] is assumed to be the potential Vw[i+1].

When the potential of the wiring RW[i+1] becomes the potential Vw[i+1], with the assumption that the amount of change in the potential of the first electrode of the capacitor C1 is substantially the same as the amount of change in the potential of the node N, the potential of the node N in the memory cell MC[i+1, j] illustrated in FIG. 9 becomes VPR−Vx[i+1, j]+Vw[i+1] and the potential of the node N in the memory cell MC[i+1, j+1] becomes VPR−Vx[i+1, j+1]+Vw[i+1]. According to Formula 15, the product-sum of the first analog current and the second analog current for the memory cell MC[i+1, j] affects a current obtained by subtracting the current Ioffset[j] from the current ΔI[j], that is, the current Iout[j]. Furthermore, the product-sum of the first analog current and the second analog current for the memory cell MC[i, j+1] and the memory cell MC[i+1, j+1] affects a current obtained by subtracting the current Ioffset[j+1] from the current ΔI[j+1], that is, the current Iout[j+1].

After Time T14, a potential between the potential VSS and the potential VDD (e.g., the potential (VDD+VSS)/2), which is the standard potential, is supplied again to the wiring RW[i+1].

Then, from Time T15 to Time T16, the second analog potential Vw[i] is supplied to the wiring RW[i] in FIG. 9 and the second analog potential Vw[i+1] is supplied to the wiring RW[i+1]. In practice, the potential of the wiring RW[i] is a potential higher than the potential between the potential VSS and the potential VDD (e.g., the potential (VDD+VSS)/2), which is the standard potential, by Vw[i] and the potential of the wiring RW[i+1] is a potential higher than the potential between the potential VSS and the potential VDD (e.g., the potential (VDD+VSS)/2) by Vw[i+1]. However, for the simplicity of the following description, the potential of the wiring RW[i] is assumed to be the potential Vw[i] and the potential of the wiring RW[i+1] is assumed to be the potential Vw[i+1].

When the potential of the wiring RW[i] becomes the potential Vw[i], with the assumption that the amount of change in the potential of the first electrode of the capacitor C1 is substantially the same as the amount of change in the potential of the node N, the potential of the node N in the memory cell MC[i, j] illustrated in FIG. 9 becomes VPR−Vx[i, j]+Vw[i] and the potential of the node N in the memory cell MC[i, j+1] becomes VPR−Vx[i, j+1]+Vw[i]. When the potential of the wiring RW[i+1] becomes the potential Vw[i+1], with the assumption that the amount of change in the potential of the first electrode of the capacitor C1 is substantially the same as the amount of change in the potential of the node N, the potential of the node N in the memory cell MC[i+1, j] illustrated in FIG. 9 becomes VPR−Vx[i+1, j]+Vw[i+1] and the potential of the node N in the memory cell MC[i+1, j+1] becomes VPR−Vx[i+1, j+1]+Vw[i+1].

According to Formula 15, the product-sum of the first analog current and the second analog current for the memory cell MC[i, j] and the memory cell MC[i+1, j] affects a current obtained by subtracting the current Ioffset[j] from the current ΔI[j], that is, the current Iout[j]. Furthermore, the product-sum of the first analog current and the second analog current for the memory cell MC[i, j+1] and the memory cell MC[i+1, j+1] affects a current obtained by subtracting the current Ioffset[j+1] from the current ΔI[j+1], that is, the current Iout[j+1].

After Time T16, a potential between the potential VSS and the potential VDD (e.g., the potential (VDD+VSS)/2), which is the standard potential, is supplied again to the wiring RW[i] and the wiring RW[i+1].

With the above configuration, the product-sum operation can be performed with a small-scale circuit, at high speed, and/or with low power consumption.

Note that a transistor with an extremely low off-state current is preferably used as the transistor Tr2, Tr5, Tr6, Tr8, or Tr9. When a transistor with an extremely low off-state current is used as the transistor Tr2, the potential of the node N can be held for a long time. When a transistor with an extremely low off-state current is used as the transistors Tr5 and Tr6, the potential of the gate of the transistor Tr4 can be held for a long time. When a transistor with an extremely low off-state current is used as the transistors Tr8 and Tr9, the potential of the gate of the transistor Tr7 can be held for a long time.

To reduce the off-state current of a transistor, a channel formation region contains a semiconductor with a wide energy gap, for example. The energy gap of the semiconductor is preferably greater than or equal to 2.5 eV, greater than or equal to 2.7 eV, or greater than or equal to 3 eV. An example of such a semiconductor material is an oxide semiconductor. A transistor containing an oxide semiconductor in a channel formation region (OS transistor) can be used as the transistor Tr2, Tr5, Tr6, Tr8, or Tr9. The leakage current of an OS transistor normalized by channel width can be lower than or equal to $10 \times 10^{-21}$ A/μm (10 zA/μm) with a source-drain voltage of 10 V at room temperature (approximately 25° C.). The leakage current of an OS transistor used as the transistor Tr2, Tr5, Tr6, Tr8, or Tr9 is preferably lower than or equal to $1 \times 10^{-18}$ A, lower than or equal to $1 \times 10^{-21}$ A, or lower than or equal to $1 \times 10^{-24}$ A at room temperature (approximately 25° C.). Alternatively, the leakage current is preferably lower than or equal to $1 \times 10^{-15}$ A, lower than or equal to $1 \times 10^{-18}$ A, or lower than or equal to $1 \times 10^{-21}$ A at 85° C.

An oxide semiconductor is a wide energy gap semiconductor in which electrons are unlikely to be excited and the effective mass of a hole is large. Accordingly, an avalanche breakdown and the like are less likely to occur in an OS transistor than in a typical transistor using silicon or the like. Since hot-carrier degradation or the like due to the avalanche breakdown is inhibited, an OS transistor has high drain withstand voltage and can be driven at high drain voltage.

An oxide semiconductor contained in a channel formation region of a transistor is preferably an oxide semiconductor containing at least one of indium (In) and zinc (Zn). Typical examples of such an oxide semiconductor include In oxide, Zn oxide, In—Zn oxide, and In—M—Zn oxide (M is Ga, Al, Ti, Y, Zr, La, Ce, Nd, or Hf). Reduction in impurities serving as electron donors, such as hydrogen, and reduction in oxygen vacancies can make an oxide semiconductor an i-type (intrinsic) or substantially i-type semiconductor. Such an oxide semiconductor can be referred to as a highly purified oxide semiconductor.

An oxide semiconductor with a low carrier density is preferably used for a channel formation region. The carrier density of the oxide semiconductor is preferably less than $8 \times 10^{11}/cm^3$ and greater than or equal to $1 \times 10^{-9}/cm^3$. The carrier density is further preferably less than $1 \times 10^{11}/cm^3$, still further preferably less than $1 \times 10^{10}/cm^3$.

Memory Cell Usable in Memory Circuit

Configuration examples of a memory cell usable in the memory circuit 107 will be described with reference to FIGS. 11A to 11F.

Figure 11A:
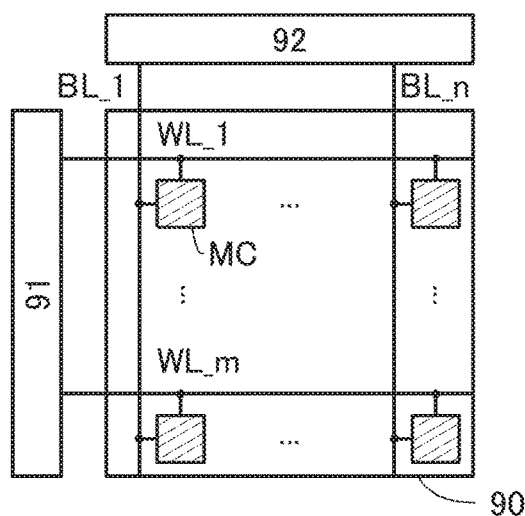
FIGS. 11A to 11F illustrate configurations of a memory circuit included in a display system.

FIG. 11A is a block diagram of a structure example of the memory circuit 107. The block diagram in FIG. 11A illustrates a memory cell array 90, a word line driver circuit 91, and a bit line driver circuit 92.

The memory cell array 90 includes memory cells MC arranged in a matrix of m rows and n columns (m and n are each a natural number). The memory cells MC are connected to word lines WL_1 to WL_m and bit lines BL_1 to BL_n. In addition to the bit lines and the word lines, the memory cells MC may be connected to a source line for supplying current, a wiring for applying voltage to a backgate of a transistor, a capacitor line for fixing a potential of one electrode of a capacitor, or the like.

The word line driver circuit 91 is a circuit that outputs a signal for selecting the memory cells MC in each row. Word lines for data writing and word lines for data reading may be provided separately as the word lines WL_1 to WL_m.

The bit line driver circuit 92 is a circuit for writing data into the memory cells MC in each column or for reading data from the memory cells MC. Bit lines for data writing and bit lines for data reading may be provided separately as the bit lines BL_1 to BL_n.

FIGS. 11B to 11F illustrate examples of a circuit configuration that the memory cell MC in FIG. 11A can have.

Figure 11B:
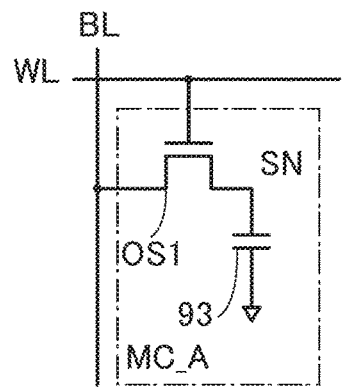

A memory cell MC_A illustrated in FIG. 11B includes a transistor OS1 and a capacitor 93. The transistor OS1 is a transistor containing an oxide semiconductor in its semiconductor layer (OS transistor). The OS transistor has a property of an extremely low leakage current in a non-conduction state (off-state current), compared to a transistor containing silicon in its semiconductor layer (Si transistor). Thus, turning off the transistor OS1 enables a charge retention node SN to retain charge based on data, resulting in a lower refresh rate of the data stored at the charge retention node SN.

Figure 11C:
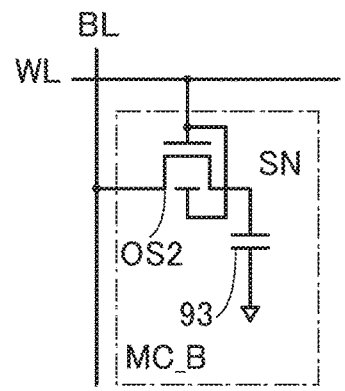

A memory cell MC_B illustrated in FIG. 11C includes a transistor OS2 and the capacitor 93. The transistor OS2 is an OS transistor. The transistor OS2 differs from the transistor OS1 of FIG. 11B in that a gate and a backgate are connected to each other so that both the gate and the backgate are supplied with a voltage of the word line WL. Adopting such a structure can increase the amount of current flowing between a source and a drain when the transistor OS2 is turned on.

Figure 11D:
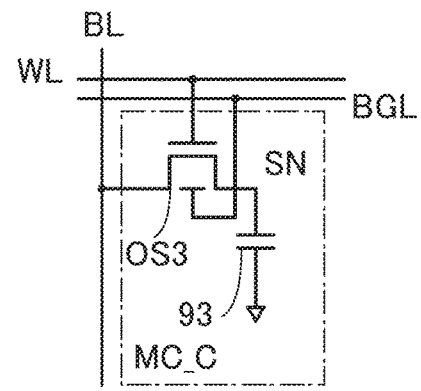

A memory cell MC_C illustrated in FIG. 11D includes a transistor OS3 and the capacitor 93. The transistor OS3 is an OS transistor. The transistor OS3 differs from the transistor OS1 of FIG. 11B in that a backgate and a backgate line BGL are connected to each other so that a voltage applied to the backgate is different from a voltage applied to a gate. With such a structure, the amount of current flowing between a source and a drain can be controlled by controlling the threshold voltage of the transistor OS3.

Figure 11E:
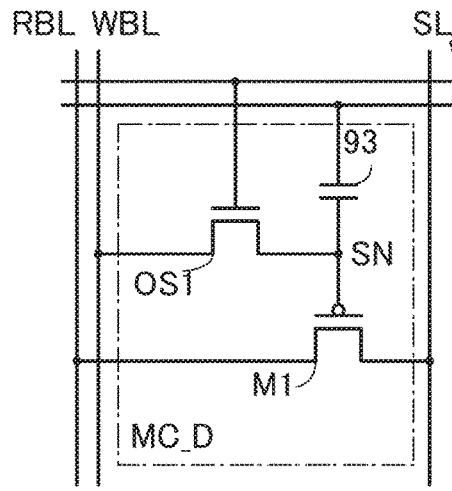

A memory cell MC_D illustrated in FIG. 11E includes the transistor OS1, a transistor M1, and the capacitor 93. One of a source and a drain of the transistor OS1 is connected to a write bit line WBL. The other of the source and the drain of the transistor OS1 is connected to a gate of the transistor M1 and one electrode of the capacitor 93. A gate of the transistor OS1 is connected to a write word line WWL. The other electrode of the capacitor 93 is connected to a read word line RWL. One of a source and a drain of the transistor M1 is connected to a read bit line RBL. The other of the source and the drain of the transistor M1 is connected to a source line SL. Although the transistor M1 is shown as a p-channel transistor, the transistor M1 may be an n-channel transistor. Turning off the transistor OS1 allows the charge retention node SN to retain charge based on data. The transistor M1 is a transistor containing silicon in its channel formation region (Si transistor). Note that the transistor OS1 can have the same structure as the transistor OS2 or the transistor OS3 described above.

Figure 11F:
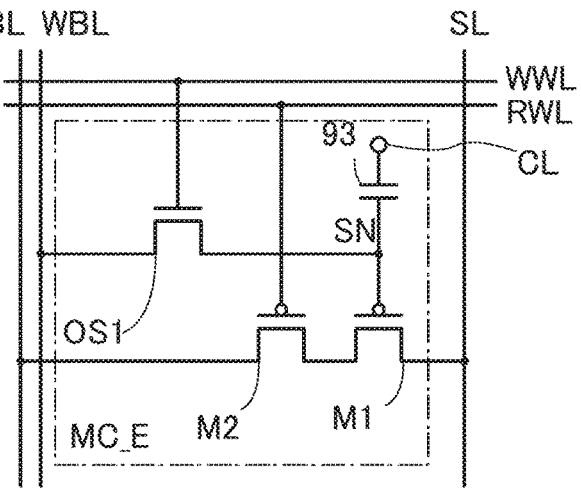

A memory cell MC_E illustrated in FIG. 11F includes the transistor OS1, the transistor M1, a transistor M2, and the capacitor 93. One of a source and a drain of the transistor OS1 is connected to the write bit line WBL. The other of the source and the drain of the transistor OS1 is connected to a gate of the transistor M1 and one electrode of the capacitor 93. A gate of the transistor OS1 is connected to the write word line WWL. The other electrode of the capacitor 93 is connected to a capacitor line CL. One of a source and a drain of the transistor M1 is connected to one of a source and a drain of the transistor M2. The other of the source and the drain of the transistor M1 is connected to the source line SL. A gate of the transistor M2 is connected to the read word line RWL. The other of the source and the drain of the transistor M2 is connected to the read bit line RBL. Although the transistor M2 is shown as a p-channel transistor, the transistor M2 may be an n-channel transistor. Turning off the transistor OS1 allows the charge retention node SN to retain charge based on data. The transistor M2 is a Si transistor. Note that the transistor OS1 can have the same structure as the transistor OS2 or the transistor OS3 described above.

Note that the configurations of the memory cells illustrated in FIGS. 11B to 11F are effective especially when the amount of data to be stored in the memory circuit is large. A memory cell composed of one to three transistors can inhibit an increase in area of the memory circuit, compared to a memory cell composed of static RAM (SRAM). In particular, the configurations of the memory cells illustrated in FIGS. 11B to 11D are effective in inhibiting an increase in circuit area.

In an OS transistor, transistor characteristics are less likely to change when the operation temperature is increased than in a Si transistor. Therefore, the memory circuit can operate more reliably in a temperature range for onboard use, such as for a car.

Note that the circuit configurations illustrated in FIGS. 11B to 11F are merely examples, and any other configurations can be employed as long as one embodiment of the present invention is achieved.

Configuration Example of Pixel in Display

In this embodiment, a configuration example of a pixel in a display applicable to the aforementioned display system will be described.

Figure 12A:
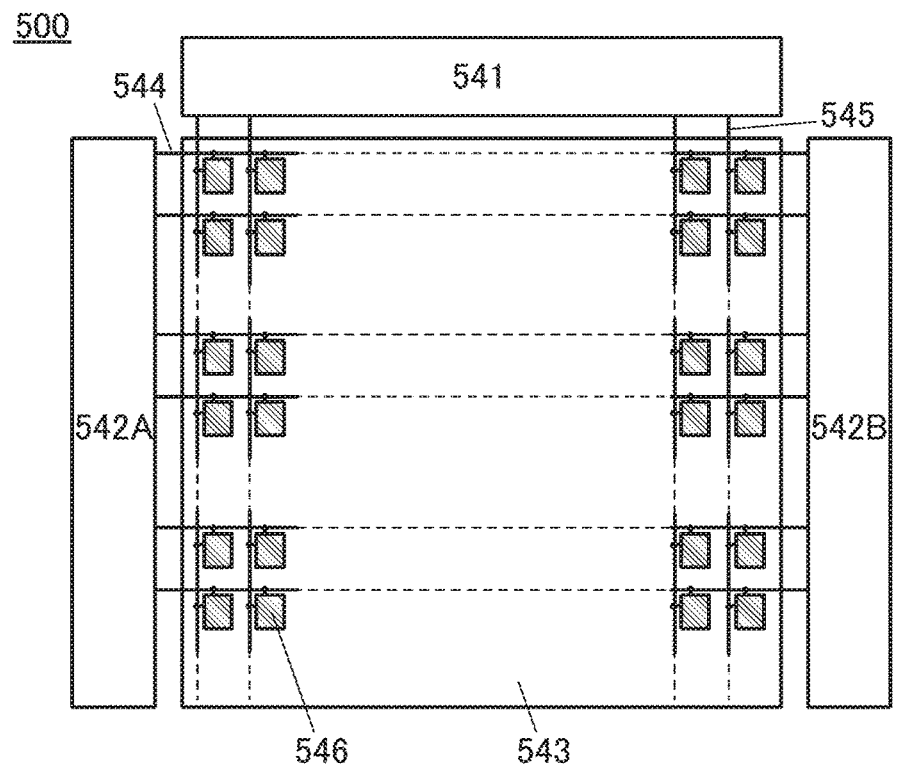
FIGS. 12A and 12B illustrate a structure of a display included in a display system.

FIG. 12A is a block diagram illustrating a structure example of a display.

A display 500 illustrated in FIG. 12A includes a driver circuit 541, a driver circuit 542A, a driver circuit 542B, and a pixel portion 543. Note that the driver circuits 541, 542A, and 542B are collectively referred to as a driver circuit or a peripheral driver circuit in some cases.

The driver circuits 542A and 542B can function as scan line driver circuits, for example. The driver circuit 541 can function as a signal line driver circuit, for example. Note that one of the driver circuits 542A and 542B may be omitted. Some sort of circuit may be provided to face the driver circuit 541 with the pixel portion 543 placed therebetween.

The display 500 in FIG. 12A also includes p wirings 544 that are arranged substantially parallel to each other and whose potentials are controlled by the driver circuit 542A and/or the driver circuit 542B, and q wirings 545 that are arranged substantially parallel to each other and whose potentials are controlled by the driver circuit 541. Note that p and q are each a natural number of 1 or more. The pixel portion 543 includes a plurality of pixels 546 arranged in a matrix. The pixel 546 includes a pixel circuit and a display element.

When every three pixels 546 function as one pixel, full-color display can be achieved. The three pixels 546 each control the transmittance, reflectance, amount of emitted light, or the like of red light, green light, or blue light. The light colors controlled by the three pixels 546 are not limited to the combination of red, green, and blue and may be yellow, cyan, and magenta.

A pixel 546 that controls white light may be added to the pixels controlling red light, green light, and blue light so that the four pixels 546 collectively function as one pixel. The addition of the pixel 546 controlling white light can increase the luminance of the display region. When the number of pixels 546 functioning as one pixel is increased to use red, green, blue, yellow, cyan, and magenta in appropriate combination, the range of color reproduction can be widened.

A wiring 544_g in a g-th row (g is a natural number of 1 to p) is connected to q pixels 546 in the g-th row among the plurality of pixels 546 arranged in p rows and q columns in the pixel portion 543. A wiring 545_h in an h-th column (h is a natural number of 1 to q) is connected top pixels 546 in the h-th column among the pixels 546 arranged in p rows and q columns.

The display 500 can employ various modes and include various display elements. Examples of display elements are elements including a display medium whose luminance or the like is changed by electric action, such as electroluminescent (EL) elements (e.g., an organic EL element, an inorganic EL element, and an EL element containing organic and inorganic materials).

Figure 12B:
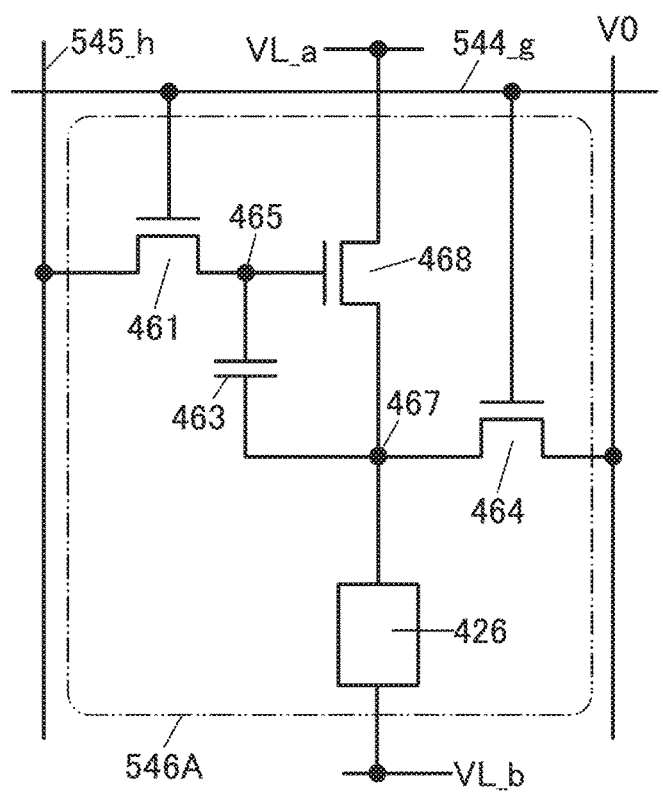

A pixel 546A illustrated in FIG. 12B includes a transistor 461, a capacitor 463, a transistor 468, a transistor 464, and a light-emitting element 426 that can function as a display element.

One of a source electrode and a drain electrode of the transistor 461 is connected to the wiring 545_h. A gate electrode of the transistor 461 is connected to the wiring 544_g. A video signal is supplied from the wiring 545_h.

The transistor 461 has a function of determining whether to write a video signal to a node 465.

One of a pair of electrodes of the capacitor 463 is connected to the node 465, and the other is connected to a node 467. The other of the source electrode and the drain electrode of the transistor 461 is connected to the node 465.

The capacitor 463 functions as a storage capacitor for storing data written to the node 465.

One of a source electrode and a drain electrode of the transistor 468 is connected to a potential supply line VL_a, and the other is connected to the node 467. A gate electrode of the transistor 468 is connected to the node 465.

One of a source electrode and a drain electrode of the transistor 464 is connected to a wiring V0, and the other is connected to the node 467. A gate electrode of the transistor 464 is connected to the wiring 544_g.

One of an anode and a cathode of the light-emitting element 426 is connected to a potential supply line VL_b, and the other is connected to the node 467.

As the light-emitting element 426, an organic electroluminescent element (organic EL element) can be used, for example. Note that the light-emitting element 426 is not limited thereto and may be an inorganic EL element containing an inorganic material, for example.

For example, one of the potential supply line VL_a and the potential supply line VL_b is supplied with a high power supply potential VDD, and the other is supplied with a low power supply potential VSS.

In the display 500 including the pixels 546A in FIG. 12B, the pixels 546 are sequentially selected row by row by the driver circuit 542A and/or the driver circuit 542B, so that the transistor 461 is turned on and a video signal is written to the node 465.

The pixel 546A in which data has been written to the node 465 is brought into a retention state when the transistors 461 and 464 are turned off. The amount of current flowing between the source electrode and the drain electrode of the transistor 468 is controlled in accordance with the potential of the data written to the node 465. The light-emitting element 426 emits light with a luminance corresponding to the amount of flowing current. This operation is sequentially performed row by row; thus, an image can be displayed.

Each of the transistors 461, 464, and 468 may be a transistor with a backgate. In that case, in each of the transistors 461, 464, and 468, the gate may be connected to the backgate.

The transistors 461, 464, and 468 are preferably OS transistors. Since the off-state current of OS transistors is extremely low as described above, the OS transistors can continue storing the potential of data written once to the node 465. When the same image is displayed, the refresh rate, which is a frequency of data writing, can be reduced; thus, the power consumption can be reduced.

In addition, OS transistors can be formed at temperatures lower than that in the case of transistors in which their channel formation regions are formed using low-temperature polysilicon (LTPS). Thus, the upper temperature limit of the base for forming the OS transistors can be lowered, which can expand the range of choices for the materials. In particular, a several-μm-thick base can be selected as a base layer of a resin such as polyimide; consequently, the display can be lighter and thinner. In addition, the display can be easily bent.

The organic EL element used as the light-emitting element 426 has a preferable response speed at low temperatures, compared to liquid crystal elements. The display is used in a wide range of ambient temperatures when being used for cars. Even in such a case, the display using an organic EL element as the light-emitting element can suppress reduction in the display quality.

Moreover, the display using an organic EL element as the light-emitting element has little change in luminance due to a difference of the viewpoint positions, compared to a display using a liquid crystal element. That is, the viewing angle dependence is small. Accordingly, when the display is used for a car, it can display information of a meter or the like correctly without blur.

Application Examples of Display System

A display capable of being used in the above display system is attachable to a surface so as to fit the shape of the surface.

Figure 13A:
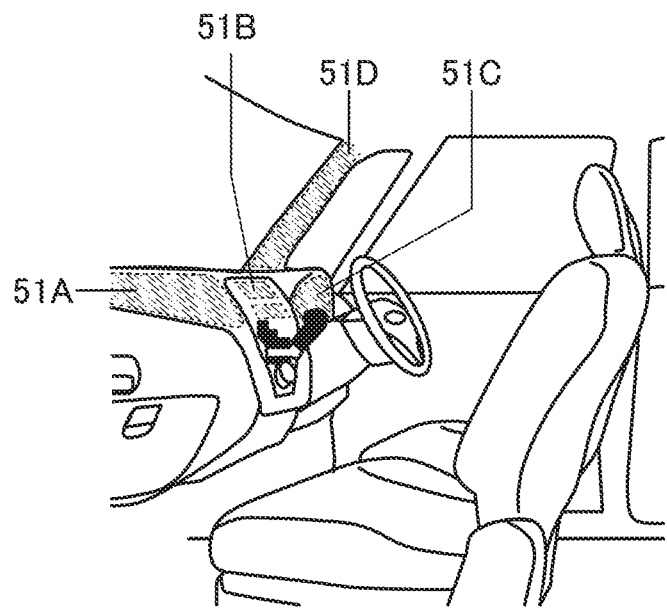
FIGS. 13A and 13B illustrate application examples of a display.

FIG. 13A illustrates a front glass and its vicinity inside a car, for example. FIG. 13A shows displays 51A to 51C that are attached to a dashboard and a display 51D that is attached to a pillar.

The displays 51A to 51C can provide various kinds of information of, for example, a navigation system, a speedometer, a tachometer, an odometer, a fuel gauge, a gear position indicator, and air-conditioning controls. Items shown on the display, their layout, and the like can be changed as appropriate to suit the user's preferences, resulting in more sophisticated design of the instrument panel. Each of the displays 51A to 51C can also be used as a lighting device.

The display 51D can compensate for the view obstructed by the pillar (blind areas) by showing an image taken by an imaging unit provided for the car body. That is, displaying an image taken by the imaging unit provided on the outside of the car body can eliminate blind spots and improve safety. Moreover, showing an image to compensate for the area that a driver cannot see makes it possible for the driver to confirm safety easily and comfortably. The display 51D can also be used as a lighting device.

Figure 13B:
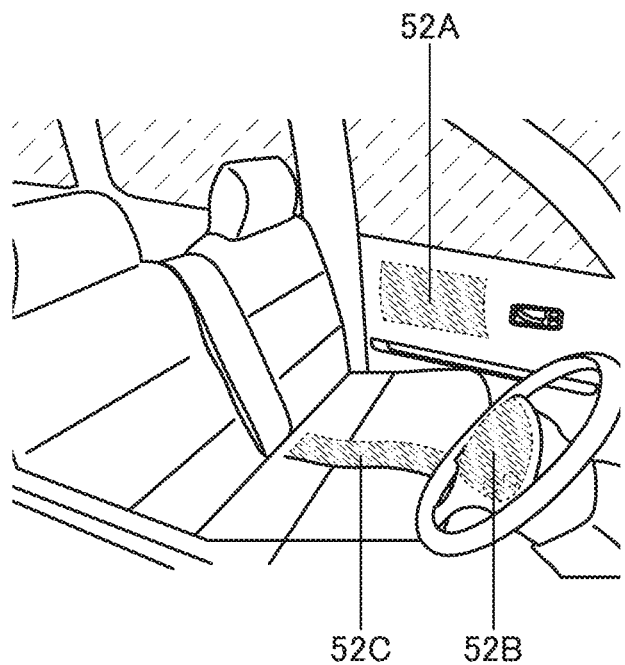

FIG. 13B illustrates the inside of a car in which a bench seat is used for a driver's seat and a front passenger seat. FIG. 13B shows a display 52A that is provided on a door, a display 52B that is provided on a steering wheel, and a display 52C that is provided in the middle of the seating surface of the bench seat.

For example, the display 52A can compensate for the view obstructed by the door by showing an image taken by an imaging unit provided for the car body.

The displays 52B and 52C can provide various kinds of information of, for example, a navigation system, a speedometer, a tachometer, an odometer, a fuel gauge, a gear position indicator, and air-conditioning controls. Items shown on the display, their layout, and the like can be changed as appropriate to suit the user's preferences. Each of the displays 52B and 52C can also be used as a lighting device.

Next, FIGS. 14A to 14D illustrate examples of vehicles.

Figure 14A:
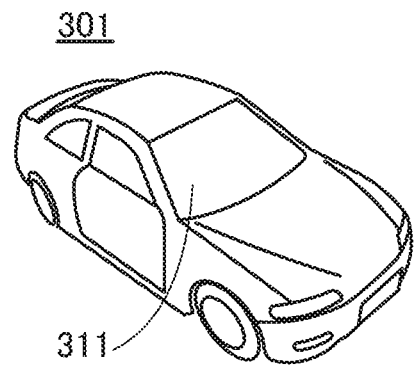
FIGS. 14A to 14D illustrate examples of vehicles.

FIG. 14A illustrates a car 301. The car 301 includes a window 311. A vehicle of one embodiment of the present invention can be the car 301 including the window 311. The display used in the display system can be provided on a curved surface inside the car 301. This structure enables the display provided on the curved surface inside the car 301 to display images with less distortion.

Figure 14B:
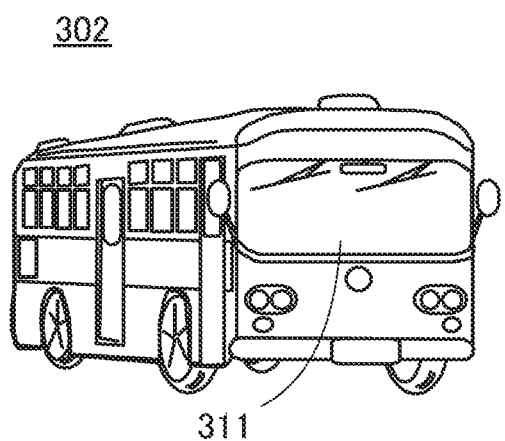

FIG. 14B illustrates a bus 302. The bus 302 includes the window 311. A vehicle of one embodiment of the present invention can be the bus 302 including the window 311. The display used in the display system can be provided on a curved surface inside the bus 302. This structure enables the display provided on the curved surface inside the bus 302 to display images with less distortion.

Figure 14C:
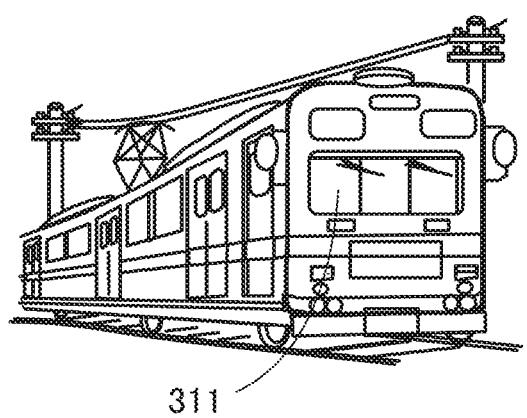

FIG. 14C illustrates a train 303. The train 303 includes the window 311. A vehicle of one embodiment of the present invention can be the train 303 including the window 311. The display used in the display system can be provided on a curved surface inside the train 303. This structure enables the display provided on the curved surface inside the train 303 to display images with less distortion.

Figure 14D:
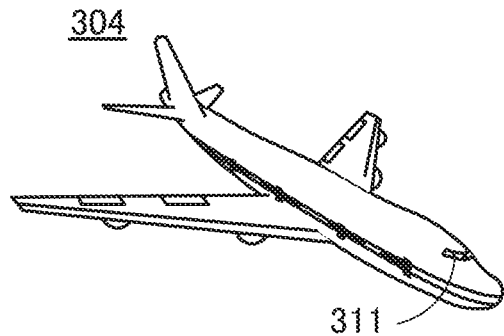

FIG. 14D illustrates an airplane 304. The airplane 304 includes the window 311. A vehicle of one embodiment of the present invention can be the airplane 304 including the window 311. The display used in the display system can be provided on a curved surface inside the airplane 304. This structure enables the display provided on the curved surface inside the airplane 304 to display images with less distortion.

Notes on Description of this Specification and the Like

In this specification and the like, ordinal numbers such as first, second, and third are used in order to avoid confusion among components. Thus, the terms do not limit the number or order of components.

In a block diagram in this specification and the like, components are functionally classified and shown by blocks that are independent of each other. However, in an actual circuit and the like, such components are sometimes hard to classify functionally, and there is a case where one circuit is associated with a plurality of functions or a case where a plurality of circuits are associated with one function. Therefore, the segmentation of blocks in a block diagram is not limited by any of the components described in the specification and can be differently determined as appropriate depending on the situation.

The same components or components having similar functions, components formed using the same material, components formed at the same time, or the like in the drawings are sometimes denoted by the same reference numerals, and the description thereof is not repeated in some cases.

In this specification and the like, the terms "one of a source and a drain" (or first electrode or first terminal) and "the other of the source and the drain" (or second electrode or second terminal) are used to describe the connection relation of a transistor. This is because the source and the drain of a transistor are interchangeable depending on the structure, operation conditions, or the like of the transistor. Note that the source and the drain of the transistor can also be referred to as a source (or drain) terminal, a source (or drain) electrode, or the like as appropriate depending on the situation.

In this specification and the like, "voltage" and "potential" can be replaced with each other. The term "voltage" refers to a potential difference from a reference potential. When the reference potential is a ground potential, for example, "voltage" can be replaced with "potential." The ground potential does not necessarily mean 0 V. Potentials are relative values, and a potential supplied to a wiring or the like is sometimes changed depending on the reference potential.

In this specification and the like, a switch is conducting or not conducting (is turned on or off) to determine whether current flows therethrough or not. Alternatively, a switch has a function of selecting and changing a current path.

For example, an electrical switch or a mechanical switch can be used. That is, a switch is not limited to a certain element and can be any element capable of controlling current.

In the case of using a transistor as a switch, the "on state" of the transistor refers to a state in which a source and a drain of the transistor are regarded as being electrically shortcircuited. The "off state" of the transistor refers to a state in which the source and the drain of the transistor are regarded as being electrically disconnected. When a transistor operates just as a switch, there is no particular limitation on the polarity (conductivity type) of the transistor.

In this specification and the like, when it is described that "A and B are connected to each other," the case where A and B are electrically connected to each other is included in addition to the case where A and B are directly connected to each other. Here, the expression "A and B are connected" means that electric signals can be transmitted and received between A and B when an object having any electric action exists between A and B.

This application is based on Japanese Patent Application serial no. 2016-098706 filed with Japan Patent Office on May 17, 2016, the entire contents of which are hereby incorporated by reference.

What is claimed is:

1. A display system comprising:
a display comprising a curved display surface; and
a control IC comprising a memory circuit, a reference memory circuit, a first circuit, and a second circuit, wherein:
the memory circuit is configured to generate a first current corresponding to first analog data, and to generate a second current corresponding to the first analog data and second analog data,
the reference memory circuit is configured to generate a reference current corresponding to reference data,
the first circuit is configured to generate and hold a third current corresponding to a difference between the first current and the reference current when the first current is lower than the reference current,
the second circuit is configured to generate and hold a fourth current corresponding to a difference between the first current and the reference current when the first current is higher than the reference current, and
one of the first circuit and the second circuit is configured to generate a fifth current corresponding to third analog data from the second current and one of the third current and the fourth current.

2. The display system according to claim 1, further comprising:
a first wiring electrically connected to the first circuit, the second circuit, and the memory circuit; and
a second wiring electrically connected to the reference memory circuit.

3. The display system according to claim 1, further comprising:
a current source circuit;
a first wiring electrically connected to the current source circuit, the first circuit, the second circuit, and the memory circuit; and
a second wiring electrically connected to the current source circuit and the reference memory circuit.

4. The display system according to claim 1,
wherein each of the memory circuit and the reference memory circuit comprises a transistor, and
wherein the display system further comprises:
a current source circuit;
a first wiring electrically connected to the current source circuit, the first circuit, the second circuit, and one of a source and a drain of the transistor of the memory circuit; and
a second wiring electrically connected to the current source circuit and one of a source and a drain of the transistor of the reference memory circuit.

5. The display system according to claim 1,
wherein each of the memory circuit and the reference memory circuit comprises a first transistor, a second transistor, and a capacitor,
wherein the display system further comprises:
a current source circuit;
a first wiring electrically connected to the current source circuit, the first circuit, the second circuit, and one of a source and a drain of the first transistor of the memory circuit; and
a second wiring electrically connected to the current source circuit and one of a source and a drain of the first transistor of the reference memory circuit, and
wherein in each of the memory circuit and the reference memory circuit, a gate of the first transistor is electrically connected to one of a source and a drain of the second transistor and an electrode of the capacitor.

6. The display system according to claim 1, further comprising a switch between the first circuit and the second circuit.

7. The display system according to claim 1, wherein the display system is configured to perform product-sum operation.

* * * * *